(12) United States Patent
Wang et al.

(10) Patent No.: US 11,672,318 B2
(45) Date of Patent: Jun. 13, 2023

(54) APPARATUSES AND METHODS FOR SAFELY DRYING AN OBJECT

(71) Applicant: SZ ZUVI TECHNOLOGY CO., LTD., Shenzhen (CN)

(72) Inventors: Mingyu Wang, Shenzhen (CN); Xingwang Xu, Shenzhen (CN)

(73) Assignee: SZ ZUVI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/477,574

(22) Filed: Sep. 17, 2021

(65) Prior Publication Data
US 2022/0000241 A1 Jan. 6, 2022

Related U.S. Application Data

(63) Continuation of application No. PCT/CN2021/092177, filed on May 7, 2021.

(30) Foreign Application Priority Data

May 9, 2020 (CN) ................. PCT/CN2020/089408
Jun. 9, 2020 (CN) ................. PCT/CN2020/095146

(51) Int. Cl.
*A45D 20/12* (2006.01)
*G01P 5/12* (2006.01)

(52) U.S. Cl.
CPC ................ *A45D 20/12* (2013.01); *G01P 5/12* (2013.01)

(58) Field of Classification Search
CPC .. A45D 20/12; A45D 20/10; A45D 2200/205; G01P 5/12
See application file for complete search history.

(56) References Cited

U.S. PATENT DOCUMENTS

| 1,720,302 A | 7/1929 | Suter |
| 2,456,669 A | 12/1948 | Bauer |

(Continued)

FOREIGN PATENT DOCUMENTS

| AU | 2014200576 A1 | 6/2015 |
| CN | 2063025 U | 10/1990 |

(Continued)

OTHER PUBLICATIONS

International Search Report in PCT/CN2020/089408 dated Feb. 7, 2021, 4 pages.

(Continued)

*Primary Examiner* — Jessica Yuen
(74) *Attorney, Agent, or Firm* — Metis IP LLC

(57) ABSTRACT

Apparatuses and methods for drying objects are provided. The apparatus can comprise a housing configured to provide an airflow channel having an airflow inlet and an airflow outlet, an airflow generating element configured to generate an airflow through the airflow channel, and one or more radiation energy sources configured to generate infrared radiation and direct, the infrared radiation toward an exterior of the housing. A device controller can control the operation of the airflow generating element and the one or more radiation energy sources, and a power element controller in connection with the device controller can control the operation of the power element that can provide power at least to the radiation energy source and the airflow generating element.

28 Claims, 10 Drawing Sheets

(56) References Cited

U.S. PATENT DOCUMENTS

| | | | |
|---|---|---|---|
| 3,006,079 | A | 10/1961 | Jepson |
| 4,323,761 | A | 4/1982 | Hubner |
| 4,382,174 | A | 5/1983 | Barns |
| 5,761,824 | A | 6/1998 | Moon et al. |
| 5,901,462 | A | 5/1999 | Rudd |
| 8,387,271 | B2 | 3/2013 | Shami et al. |
| 9,498,039 | B2 | 11/2016 | Matsui et al. |
| 10,021,952 | B2 | 7/2018 | Goldman et al. |
| 10,470,545 | B2 | 11/2019 | Thiebaut et al. |
| 11,000,104 | B2 | 5/2021 | Goldman et al. |
| 11,146,088 | B2 * | 10/2021 | Chen ................ H02H 7/18 |
| 2003/0152373 | A1 | 8/2003 | Wong et al. |
| 2003/0192194 | A1 | 10/2003 | Evanyk |
| 2004/0001707 | A1 | 1/2004 | Ryu et al. |
| 2004/0159002 | A1 | 8/2004 | Carlucci et al. |
| 2005/0069303 | A1 | 3/2005 | Maione et al. |
| 2018/0036553 | A1 | 2/2018 | Shiibashi et al. |
| 2020/0221845 | A1 | 7/2020 | Goldman et al. |
| 2021/0289907 | A1 | 9/2021 | Jeong et al. |
| 2021/0289908 | A1 | 9/2021 | Lo |
| 2021/0307473 | A1 | 10/2021 | Conrad |
| 2021/0315356 | A1 | 10/2021 | Kim et al. |
| 2021/0345751 | A1 | 11/2021 | Nelson et al. |

FOREIGN PATENT DOCUMENTS

| | | | |
|---|---|---|---|
| CN | 2111677 | U | 8/1992 |
| CN | 202233647 | U | 5/2012 |
| CN | 202820034 | U | 3/2013 |
| CN | 103815644 | A | 5/2014 |
| CN | 105286263 | A | 2/2016 |
| CN | 205162245 | U | 4/2016 |
| CN | 105639981 | A | 6/2016 |
| CN | 205696318 | U | 11/2016 |
| CN | 106617613 | A | 5/2017 |
| CN | 107949293 | A | 4/2018 |
| CN | 208129714 | U | 11/2018 |
| CN | 109527764 | A | 3/2019 |
| CN | 208676494 | U | 4/2019 |
| CN | 111093421 | A | 5/2020 |
| CN | 111148448 | A | 5/2020 |
| EP | 1510147 | A2 | 3/2005 |
| FR | 2471158 | A1 | 6/1981 |
| JP | 2005177234 | A | 7/2005 |
| JP | 2019050945 | A | 4/2019 |
| JP | 2020044041 | A | 3/2020 |
| WO | 9926512 | A1 | 6/1999 |
| WO | 0000055 | A2 | 1/2000 |
| WO | 2018021309 | A1 | 2/2018 |
| WO | 2020095515 | A1 | 5/2020 |

OTHER PUBLICATIONS

Written Opinion in PCT/CN2020/089408 dated Feb. 7, 2021, 4 pages.
International Search Report in PCT/CN2020/095146 dated Feb. 10, 2021, 3 pages.
Written Opinion in PCT/CN2020/095146 dated Feb. 18, 2021, 4 pages.
International Search Report in PCT/CN2021/082835 dated Jun. 22, 2021, 4 pages.
Written Opinion in PCT/CN2021/082835 dated Jun. 22, 2021, 4 pages.
International Search Report in PCT/CN2021/092177 dated Aug. 5, 2021, 5 pages.
Written Opinion in PCT/CN2021/092177 dated Aug. 5, 2021, 4 pages.

* cited by examiner

APPARATUSES AND METHODS FOR SAFELY DRYING AN OBJECT

CROSS-REFERENCE TO RELATED APPLICATIONS

This application is a continuation of International Application No. PCT/CN2021/092177, filed on May 7, 2021, which claims to priority to International Application No. PCT/CN2020/089408, filed on May 9, 2020, and International Application No. PCT/CN2020/095146, filed on Jun. 9, 2020, the content of each of which is hereby incorporated by reference in their entirety.

TECHNICAL FIELD

The present disclosure relates generally to an apparatus for drying an object. More particularly, the present disclosure relates to safety features of a hair dryer which utilizes infrared (IR) radiation to heat and remove water from hair.

BACKGROUND

A traditional hair dryer (e.g., blow dryer) blows hot air to dry wet hair. The hair dryer extracts room temperature air in by a motor-driven impeller and heats the airflow up by a resistive heating element (e.g., nichrome wire). The hot airflow increases a temperature of the hair as well as the air surrounding the hair. An evaporation of water from wet hair is accelerated since the increased temperature facilitates individual molecules in a water droplet to overcome their attraction to one another and change from a liquid state to a gas state. Higher temperature in the air surrounding the hair also reduces the relative humidity around the wet hair which further accelerates the evaporation process.

In heating up the airflow, traditional hair dryers use a resistive heating element to transform electric energy into convective heat. However, the convective heat transfer can be low in heat transfer efficiency because only a portion of the hot airflow arrives at the hair and only a portion of heat carried by the hot airflow arriving at the hair is transferred to the hair and water on the hair (e.g., some of the heat is absorbed by the surrounding air). In addition, the convective heat used by a traditional hair dryer overexposes the hair to hot airflow in order to dry it completely. The hair is heated on the surface only, which can cause frizz and dry, damaged hair.

SUMMARY

A need exists for an improved apparatus for drying hair as well as other objects, such as fabrics, with a higher energy efficiency. Infrared (IR) radiation is utilized as a source of heat energy in the drying apparatus of the disclosure to remove water and moisture from objects. An infrared radiation energy source can emit infrared energy to provide stable and consistent heat. The infrared energy can be directed onto the object (e.g., hair), therefore heat is transferred to the object directly in a radiation heat transfer manner, which increases a heat transfer efficiency.

A need exists for management of an operating temperature in the infrared radiation energy source to prevent an overheat and consequently a shortened service life of the infrared radiation energy source. An operating temperature in the infrared radiation energy source is managed by positioning a portion of the infrared radiation energy source to contact an airflow channel or the airflow within the airflow channel, such that extra heat from the infrared radiation energy source can be transferred to the airflow channel or the airflow.

A need exists for compact and light-weight cordless apparatus for drying objects. A cordless drying apparatus of the disclosure can be powered by rechargeable and/or replaceable embedded batteries, making the drying apparatus portable and convenient. As a result of the improved heat transfer efficiency and energy efficiency of the infrared radiation energy source, an operating time of the battery powered cordless drying apparatus can be extended while maintaining a high output power density to guarantee a satisfactory drying effect.

A need also exists for an apparatus for drying hair which is capable of preventing heat damage to hair. The apparatus for drying hair can be provided with a plurality of sensors to measure parameters of the user's hair, the surrounding environment and/or operation of the apparatus. The apparatus for drying hair can give tactile feedback to the user if, for example, the user holds the apparatus too close to the hair or a malfunction is detected in the apparatus, such that the user can adjust or stop operating the apparatus.

A need also exists for an apparatus for drying hair which is capable of providing adequate safety features to prevent accident and fire hazards. The apparatus for drying hair can adopt a comprehensive safety scheme to ensure the safety when the apparatus is in operation.

Disclosed herein is an apparatus for drying an object. The apparatus can comprise a housing configured to provide an airflow channel having an airflow inlet and an airflow outlet; an airflow generating element contained in the housing and configured to effect an airflow through the airflow channel; one or more radiation energy sources configured to generate infrared radiation and direct the infrared radiation toward an exterior of the housing, at least one of the one or more radiation energy sources comprising a first portion that is positioned not contacting the airflow channel; and a power element configured to provide power at least to the radiation energy source and the airflow generating element. A method for drying an object is also disclosed. The method can comprise providing an airflow channel, via a housing, the airflow channel having an airflow inlet and an airflow outlet; effecting an airflow, via an airflow generating element contained in the housing, through the airflow channel; generating an infrared radiation, via one or more radiation energy sources, and directing the infrared radiation toward an exterior of the housing, at least one of the one or more radiation energy sources comprising a first portion that is positioned not contacting the airflow channel; and providing power, via a power element to at least the radiation energy source and the airflow generating element.

Also disclosed herein is an apparatus for drying an object. The apparatus can comprise a housing configured to provide an airflow channel having an airflow inlet and an airflow outlet; an airflow generating element contained in the housing and configured to effect an airflow through the airflow channel; one or more radiation energy sources contained in the housing and configured to generate an infrared radiation and direct the infrared radiation toward an exterior of the housing; a thermal coupling coupled to at least one of the one or more radiation energy sources and configured to dissipate heat from the at least one of the one or more radiation energy source; and a power element configured to provide power at least to the radiation energy sources and the airflow generating element. A method for drying an object is also disclosed. The method can comprise providing an airflow channel, via a housing, the airflow channel having an airflow inlet and an airflow outlet; effecting airflow, via an airflow generating element contained in the housing, through the airflow channel; generating infrared radiation, via one or more radiation energy sources contained in the housing, and directing the infrared radiation toward an exterior of the housing; dissipating heat, via a thermal coupling coupled to at least one of the one or more radiation energy sources, of the at least one of the one or more radiation energy source; and providing power, via a power element to at least the radiation energy source and the airflow generating element.

Also disclosed herein is an apparatus for drying an object. The apparatus can comprise a housing; one or more radiation energy sources configured to generate infrared radiation and direct the infrared radiation toward an exterior of the housing, each of the one or more radiation energy sources comprising a reflector, the reflector having an opening toward the exterior of the housing; and a power element configured to provide power at least to the radiation energy source. At least one of the reflectors of the one or more radiation energy sources can have a cut-away shape.

Also disclosed herein is a radiation energy source. The radiation energy source can comprise a radiation emitter, the radiation emitter being configured to generate an infrared radiation; and a reflector, the reflector having at least one vertex and an opening toward an exterior of the radiation energy source, the reflector being configured to direct the infrared radiation toward the exterior of the radiation energy source. The radiation emitter can be positioned and oriented such that a distal end of the radiation emitter does not point to the opening. A radiation emitter is also disclosed. The radiation emitter can comprise a radiation generating element configured to generate a radiation when powered; a radiation reflecting element positioned beneath the radiation generating element and configured to reflect at least a portion of the radiation toward an exterior of the radiation emitter; and a sealing member configured to seal the radiation generating element and the radiation reflecting element.

Also disclosed herein is an apparatus for drying an object. The apparatus can comprise a housing; one or more radiation energy sources configured to generate infrared radiation and direct the infrared radiation toward an exterior of the housing, each of the one or more radiation energy sources comprising a radiation emitter of the disclosure and a reflector, the reflector having an opening toward the exterior of the housing; and a power element configured to provide power at least to the radiation energy source.

Also disclosed herein is an apparatus for drying an object. The apparatus can comprise a housing configured to provide an airflow channel having an airflow inlet and an airflow outlet; an airflow generating element contained in the housing and configured to effect an airflow through the airflow channel, the airflow generating element comprising at least a low noise motor; a radiation energy source contained in the housing and configured to generate infrared radiation and direct the infrared radiation toward an exterior of the housing; and a power element configured to provide power at least to the radiation energy source and the airflow generating element.

Also disclosed herein is a method for drying an object. The method can comprise providing an airflow channel, via a housing, the airflow channel having an airflow inlet and an airflow outlet; effecting airflow, via an airflow generating element contained in the housing, through the airflow channel, the airflow generating element comprising at least a low noise motor; generating infrared radiation, via a radiation energy source contained in the housing, and directing the infrared radiation toward an exterior of the housing; and providing power, via a power element to at least the radiation energy source and the airflow generating element.

Also disclosed herein is an apparatus for drying an object. The apparatus can comprise a power element configured to provide power at least to the radiation energy source and the airflow generating element; a power element controller configured to control operation of the power element; and a device controller that is configured to control operation of the airflow generating element and the one or more radiation energy sources, wherein the power element controller is in connection with the device controller.

Also disclosed herein is an apparatus for drying an object. The apparatus can comprise a a housing configured to provide an airflow channel having an airflow inlet and an airflow outlet; one or more radiation energy sources configured to generate radiation and direct the radiation toward an exterior of the housing to heat up the object being dried by radiation; an airflow generating element contained in the housing and configured to generate an airflow through the airflow channel to cool down the object being dried; and a device controller that is configured to detect a wind speed in the airflow channel by measuring a resistance value of a temperature sensitive resistor.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
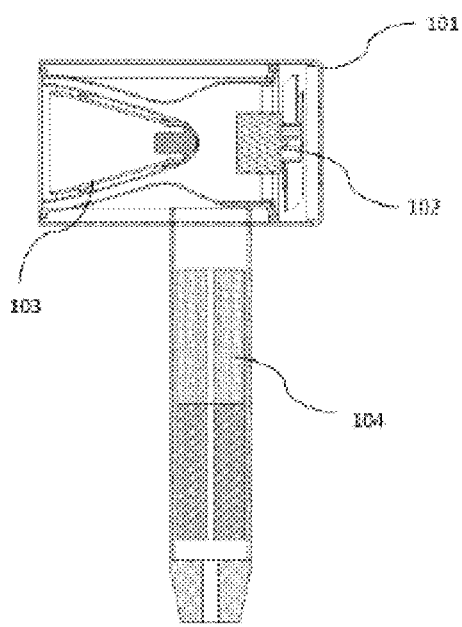
FIG. 1 is a cross-sectional view showing an exemplary hair dryer in accordance with embodiments of the disclosure.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing parameters of components, technical effects, and so forth used in the specification and claims are to be understood as being modified in all instances by the term "about" or "substantially." Accordingly, unless indicated to the contrary, the numerical parameters set forth in the following specification and attached claims are approximations that may vary depending upon the desired properties and effects sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are provided as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Apparatuses and methods for drying objects are provided. The drying apparatus of the disclosure can remove water and moisture from objects (e.g., hair, fabrics) by utilizing an infrared (IR) radiation energy source as source of heat energy. The infrared radiation energy source can emit infrared energy having predetermined wavelength range and power density to heat the object. The heat carried by the infrared energy is directly transferred to the object in a radiation heat transfer manner, such that a heat transfer efficiency is improved as compared with the conventional convective heat transfer manner (e.g., substantially no heat is absorbed by surrounding air in the radiation heat transfer manner, while a big portion of heat is absorbed by the surrounding air and then blown away in the conventional convective heat transfer manner). The infrared radiation energy source can be used in combination with an airflow generating element (e.g., a motor-driven impeller), which airflow further accelerates an evaporation of water from the object.

Another benefit of utilizing infrared radiation as source of heat energy is that the infrared heat penetrates the hair shaft down to the cortex of the hair cuticle, therefore it dries hair faster and also relaxes and softens the hair. The infrared energy is also believed to aid scalp health and stimulates hair growth by increasing blood flow of scalp. The utilization of infrared radiation energy source can enable a compact and lightweight drying apparatus because no resistive wire grid is needed to heat the airflow up. The improved heat transfer efficiency and energy efficiency of infrared radiation energy source can also enable a cordless drying apparatus, which is powered by embedded battery, to operate at an extended operating time.

FIG. 1 is a cross-sectional view showing an exemplary hair dryer in accordance with embodiments of the disclosure. The hair dryer can comprise a housing 101. Various electric, mechanical and electromechanical components, such as an airflow generating element 102, a radiation energy source 103, a control circuit (not shown) and a power adaptor (not shown), can be received in the housing 101. The radiation energy source 103 can be configured to generate radiation heat energy and direct the heat energy to the user's hair. The airflow generating element 102 can be configured to generate an airflow which facilitates an evaporation of water from user's hair. The hair dryer can comprise a power element configured to energize at least the radiation energy source and the airflow generating element.

The hair dryer can be powered with an external power source. The power element can comprise a power adapter which regulates a voltage and/or a current received from the external power source. For instance, the hair dryer can be energized by electrically connecting to an external battery or a power grid via a power cord. Additionally, or alternatively, the hair dryer can be powered with an embedded power source. The power element can comprise one or more batteries which are received within the housing. The one or more batteries can be rechargeable (e.g., secondary battery) and/or replaceable. In an exemplary example, one or more batteries 104 can be received in the housing (e.g., a handle of the housing) of the hair dryer. A status of the battery (e.g., a battery charge status, a remaining power) can be provided by means of, for example, a screen or light-emitting diode (LED) indicator on the housing.

The housing can comprise a body and a handle, each of which can receive therein at least a portion of the electric, mechanical and electromechanical components. In some instances, the body and the handle can be integral. In some instances, the body and the handle can be separate components. For instance, the handle can be detachable from the body. In an exemplary example, the detachable handle can contain therein one or more batteries which are used to power the hair dryer. The housing can be made from an electrical insulating material having a high resistance to electrical flow. Examples of the electrical insulating material can include polyvinyl chloride (PVC), polyethylene terephthalate (PET), acrylonitrile-butadiene-styrene copolymer (ABS), polyester, polyolefins, polystyrene, polyurethane, thermoplastic, silicone, glass, fiberglass, resin, rubber, ceramic, nylon, and wood. The housing can also be made from a metallic material coated with an electrical insulating material or a combination of electrical insulation material and metallic material coated or not coated with electrical insulation material. For example, the electrical insulating material can form an inner layer of the housing, while the metallic material can form an outer layer of the housing.

The housing can provide one or more airflow channels therein. The airflow generated by the airflow generating element can be directed and/or regulated through an airflow channel and toward the user's hair. For instance, the airflow channel can be shaped to regulate at least a velocity, a throughput, an angle of divergence or a vorticity of the airflow exiting the hair dryer. The airflow channel can include an airflow inlet and an airflow outlet. In an exemplary example, the airflow inlet and the airflow outlet can be positioned at opposite ends of the hair dryer along a longitudinal direction thereof. The airflow inlet and the airflow outlet can each be vent that allows efficient airflow throughput. The environment air can be extracted into the airflow channel via the airflow inlet to generate the airflow, and the generated airflow can exit the airflow channel via the airflow outlet.

In some instances, one or more air filters can be provided at the airflow inlet to prevent dust or hair from entering the airflow channel. For instance, an air filter can be a mesh having appropriate mesh size. The air filter can be detachable or replaceable for cleaning and maintenance. In some instances, an airflow regulator can be provided at the airflow outlet. The airflow regulator can be a detachable nozzle, comb or curler. The airflow regulator can be configured to modulate a velocity, a throughput, an angle of divergence or a vorticity of the airflow blowing out from the airflow outlet. For instance, the airflow regulator can be shaped to converge (e.g., concentrate) the airflow at a predetermined distance in front from the airflow outlet. For instance, the airflow regulator can be shaped to diffuse the airflow exiting the airflow outlet.

Figure 2:
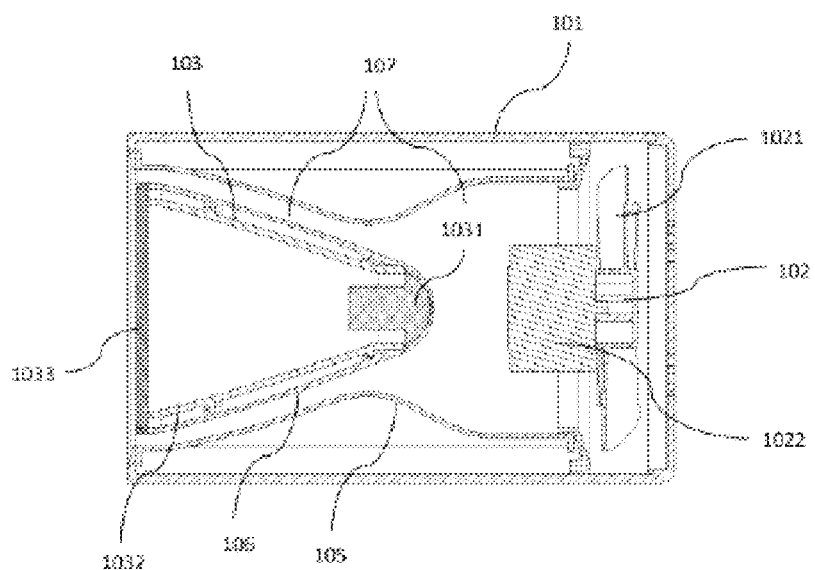
FIG. 2 is an enlarged cross-sectional view showing an airflow generating element and a radiation energy source in an exemplary hair dryer in accordance with embodiments of the disclosure.

As exemplarily illustrated in FIG. 2, which is an enlarged cross-sectional view showing the airflow generating element and the radiation energy source in an exemplary hair dryer in accordance with embodiments of the disclosure, the airflow generating element 102 can comprise an impeller 1021 driven by a motor 1022. The impeller can comprise a plurality of blades. When actuated by the motor, a rotation of the impeller can extract environment air into the airflow channel via the airflow inlet to generate the airflow, push the generated airflow through the airflow channel and eject the airflow out of the airflow outlet. The motor can be supported by a motor holder or housed in a motor shroud. The motor can be a brushless motor of which a speed of rotation can be regulated under the control of a controller (not shown). For instance, a speed of rotation of the motor can be controlled by a preset program, a user's input or a sensor data. A dimension of the motor, measured in any direction, can be in a range from 14 mm (millimeter) to 21 mm. A power output of the motor can be in a range from 35 to 80 watts (W). A maximum velocity of the airflow exiting from the airflow outlet can be at least 8 meters/second (m/s).

Though the airflow generating element 102 is illustrated in FIG. 1 and FIG. 2 as being received in the body of the housing, those skilled in the art can appreciate that it can also be positioned in the handle. For instance, a rotation of the impeller can extract air into a vent (e.g., airflow inlet) provided at the handle and push the air through the airflow channel to the airflow outlet provided at an end of the body of the housing. The airflow channel can accordingly extend through the handle and body of the housing.

The radiation energy source 103 can be configured to generate an infrared radiation and direct the infrared radiation toward an exterior of the housing. The radiation energy source can be supported by a radiation energy source holder or housed in a radiation energy source shroud. In some embodiments, the radiation energy source can be an infrared lamp which converts electric energy into infrared radiation energy. In an exemplary example, the infrared lamp can comprise a radiation emitter configured to emit a radiation having a predetermined wavelength and a reflector configured to reflect the radiation toward the outlet of the airflow channel. In another exemplary example, the infrared lamp can also be an infrared Light Emitting Diode (LED) or a laser device such as Carbon Dioxide Laser. In an exemplary example where a laser device is utilized as the infrared lamp, a reflector may not necessarily needed. An optical element can be provided to diverge the radiation from the laser device to increase an area that is radiated by the infrared radiation. The radiation energy can be directed to user's hair. Therefore, heat is transferred to the hair in a radiation heat transfer manner, which increases a heat transfer efficiency of the hair dryer. Details of the infrared lamp will be provided in the disclosure hereinafter.

Figure 4:
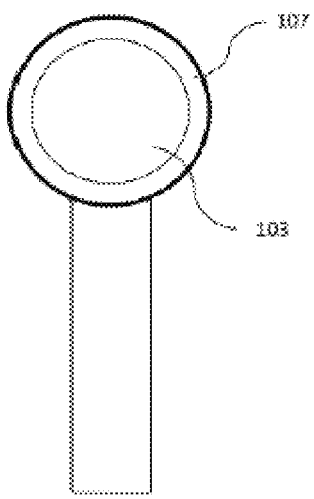
FIG. 4 is a lateral view showing an appearance of an exemplary hair dryer in accordance with embodiments of the disclosure.
Figure 5:
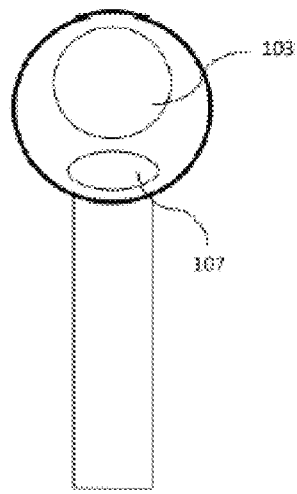
FIG. 5 is a lateral view showing an appearance of another exemplary hair dryer in accordance with embodiments of the disclosure.

In the exemplary example shown in FIG. 2, an airflow channel enclosure 105 can be provided to define the airflow channel 107 (e.g., as a boundary of the airflow channel). The airflow channel enclosure 105 can substantially extend from one longitudinal end of the hair dryer to the other longitudinal end. The motor and impeller can be positioned adjacent to an inlet end of the airflow channel enclosure. A property of the airflow (e.g., a velocity, an angle of divergence or a vorticity) can be regulated by the airflow channel enclosure. For instance, a cross-sectional shape of the airflow channel enclosure can vary along a longitudinal direction thereof to generate a desired velocity distribution and/or angle of divergence of the airflow exiting the airflow outlet. In some instances, the infrared lamp can be housed within an infrared lamp enclosure 106. The infrared lamp enclosure can serve to protect the infrared lamp. A space between an outer surface of the infrared lamp and an inner surface of the infrared lamp enclosure can be provided with a degree of vacuum. In some embodiments, the infrared lamp enclosure 106 can be positioned within the airflow channel enclosure 105. At least a portion of the airflow channel 107 can be defined by the airflow channel enclosure 105 and the infrared lamp enclosure 106, as shown in FIG. 2. A lateral view of a hair dryer having this configuration is shown in FIG. 4, where an output of the infrared lamp 103 is encompassed by the airflow outlet of the airflow channel 107. In some embodiments, the infrared lamp enclosure can be positioned external to the airflow channel enclosure (for example, the infrared lamp enclosure is not encompassed by the airflow channel enclosure). A lateral view of a hair dryer having this configuration is shown in FIG. 5, where an output of the infrared lamp 103 is separated from the airflow outlet of the airflow channel 107. Those in the art will appreciate that either the airflow channel enclosure or the infrared lamp enclosure can be optional.

Though the airflow channel is illustrated in FIG. 1 and FIG. 2 as extending from the airflow inlet at one longitudinal end of the body of the housing to the airflow outlet at the other longitudinal end of the body of the housing, those skilled in the art can appreciate that the airflow inlet and/or airflow outlet can be distributed over the housing of the hair dryer of the disclosure, and more than one airflow channel and/or branches of the airflow channel can be provided within the housing of the hair dryer. In an example, at least a portion of the airflow inlet can be positioned at the handle of the housing. In another example, at least a portion of the airflow outlet can be positioned at the handle of the housing, such that a portion of the airflow can be introduced to and flow through the one or more batteries received in the handle, thereby cooling down the one or more batteries.

Figure 3:
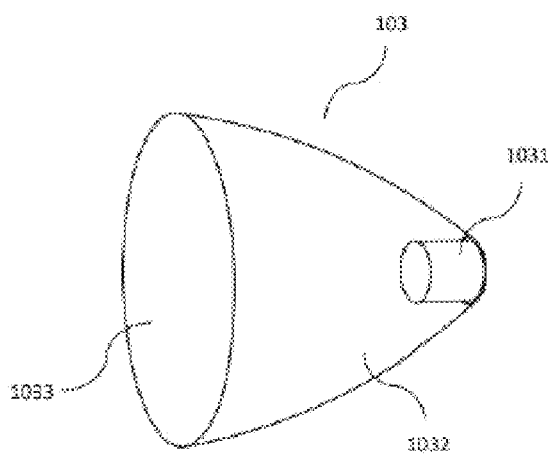
FIG. 3 is a schematic showing an exemplary radiation energy source in accordance with embodiments of the disclosure.

FIG. 3 is a schematic showing an exemplary radiation energy source in accordance with embodiments of the disclosure. In some embodiments, the radiation energy source can be an infrared lamp. The infrared lamp 103 can comprise a reflector 1032 having an opening directed to the airflow outlet of the a channel and a radiation emitter 1031 positioned within an interior of the reflector. The radiation emitter 1031 can be configured to emit a radiation within a predetermined wavelength range. The radiation emitted from the radiation emitter can be reflected by a reflecting surface (e.g., inner surface) of the reflector 1032 toward an exterior of the hair dryer.

The radiation emitter can be a conductive heater (e.g., a heater operated on a metal resistor or a carbon fiber) or a ceramic heater. Example of the metal resistor can include tungsten filament and Chromel (e.g., an alloy of nickel and chrome, also known as nichrome) filament. Examples of the ceramic heater can comprise a positive temperature coefficient (PTC) heater and a metal-ceramic heater (MCH). A ceramic heater includes metal heating elements buried inside the ceramics, for example tungsten inside silicon nitride or silicon carbide. The radiation emitter can be provided in a form of wire (e.g., filament). The wire can be patterned (e.g., spiral filament) to increase a length and/or surface thereof. The radiation emitter can also be provided in a form of rod. In an exemplary example, the radiation emitter can be a silicon nitride rod, a silicon carbide rod or a carbon fiber rod having a predetermine diameter and length.

In some instances, the radiation emitted by the radiation emitter can substantially cover visible spectrum from 0.4 μm to 0.7 μm and infrared spectrum above 0.7 μm. In some instances, the radiation emitted by the radiation emitter can substantially cover infrared spectrum only. In an exemplary example, the radiation emitter, when energized, can emit a radiation having a wavelength from 0.7 μm to 20 μm. A power density of radiation emitted by the radiation emitter can be at least 1 kW/m$^2$, 2 kW/m$^2$, 3 kW/m$^2$, 4 kW/m$^2$, 5 kW/m$^2$, 6 kW/m$^2$, 7 kW/m$^2$, 8 kW/m$^2$, 9 kW/m$^2$, 10 kW/m$^2$, 20 kW/m$^2$, 30 kW/m$^2$, 40 kW/m$^2$, 50 kW/m$^2$, 60 kW/m$^2$, 70 kW/m$^2$, 80 kW/m$^2$, 90 kW/m$^2$, 100 kW/m$^2$, 120 kW/m$^2$, 140 kW/m$^2$, 160 kW/m$^2$, 180 kW/m$^2$, 200 kW/m$^2$, 220 kW/m$^2$, 240 kW/m$^2$, 260 kW/m$^2$, 280 kW/m$^2$, 300 kW/m$^2$, 350 kW/m$^2$, 400 kW/m$^2$, 450 kW/m$^2$, 500 kW/m$^2$, or more.

Object will radiate in the infrared to visible wavelength range as a form of heat transfer. This heat transfer is referred to blackbody radiation. Blackbody radiation can be utilized as infrared source. Blackbody is a broadband radiation. The central wavelength as well as spectrum bandwidth decrease as the temperature increases. The total energy will be proportional to $S \times T^4$, where S refers to the surface area and T is the temperature. It is essential to raise the temperature in order to have a higher infrared emission. A temperature of the radiation emitter 1031 can be at least 500, 600, 700, 800, 900, 1000, 1100, 1200, 1300, 1400, 1500, 1600, 1700, 1800, 1900 or 2000 degrees centigrade (° C.). In an exemplary example, the temperature of the radiation emitter can be 900 to 1500 degrees centigrade. The central wavelength or range of wavelength of radiation emitted by the radiation emitter can be tunable, for example, by at least 0.5, 1.0, 105, 2.0, 2.5, 3.0, 3.5, 4.0, 4.5, 5.0, 5.5, 6.0, 6.5, 7.0, 7.5, 8.0, 8.5, 9.0, 9.5 or 10.0 μm. The power density of radiation emitted from the radiation emitter can be adjustable under different operation mode of the hair dryer (e.g., a rapid-dry mode, a hair-health mode, etc.), for example, by changing an electric voltage and/or current supplied thereto.

The reflector 1032 can be configured to regulate the radiation emitted from the radiation emitter. For instance, the reflector can be shaped to reduce a divergence angle of the reflected beam of radiation. In an embodiment, the reflector 1032 can have a substantially cone shape as shown in FIG. 2. For instance, a cross section of a reflecting surface of the reflector can be parabolic. The radiation emitter 1031 can be positioned at a focal point of the parabola, such that the reflected beam of radiation can be a substantially parallel beam of radiation. The radiation emitter can also be positioned offset the focal point of the parabola, such that the reflected beam of radiation can be convergent or divergent at a distance in front of the hair dryer. A position of the radiation emitter 1031 in the reflector 1032 can be adjustable, therefore, a degree of convergence and/or a direction of the output beam of radiation can be changed. The shape of the reflector and shape of the radiation emitter can be optimized and varied with respective to each other for desired heating power output at a desired position exterior to the hair dryer.

The reflecting surface of the reflector can be coated with a coating material having a high reflectivity to a wavelength or a range of wavelength of the radiation emitted by the radiation emitter. For instance, the coating material can have a high reflectivity to a wavelength in both visible spectrum and infrared light spectrum. A material having high reflectivity can have a high effectiveness in reflecting radiant energy. Examples of the coating material can include metallic material and dielectric material. The metallic material can include, for example, gold, silver and aluminum. The dielectric coating can have layers of alternating dielectric materials such as magnesium fluoride and calcium fluoride. The reflectivity of the coated reflecting surface of the reflector can be at least 90% (e.g., 90% of the incident radiation is reflected by the reflecting surface of the reflector), 90.5%, 91%, 91.5%, 92%, 92.5%, 93%, 93.5%, 94%, 94.5%, 95%, 95.5%, 96%, 96.5%, 97%, 97.5%, 98%, 98.5%, 99%, 99.5%, 99.6%, 99.7%, 99.8%, 99.9% or higher. In some instances, the reflectivity of the coated reflecting surface of the reflector can be substantially 100%, meaning that substantially all the radiation emitted by the radiation emitter can be reflected toward an exterior of the hair dryer. As a result, a temperature on an surface of the reflector is substantially not increased by the radiation emitted from the radiation emitter, even if a temperature of the radiation emitter is high.

An optical element 1033 can be provided at the opening of the reflector. The optical element can abut against the opening of the reflector in an air-tight manner. The optical element can include lens, reflector, prism, grating, beam splitter, filter or a combination thereof that modifies or redirects light. In some embodiments, the optical element can be a lens. In some embodiments, the optical element can be a Fresnel lens.

The interior of the reflector can be configured to have a degree of vacuum. A pressure within the interior of the reflector can be less than 0.9 standard atmosphere (atm), 0.8 atm, 0.7 atm, 0.6 atm, 0.5 atm, 0.4 atm, 0.3 atm, 0.2 atm, 0.1 atm, 0.05 atm, 0.01 atm, 0.001 atm, 0.0001 atm or less. In an exemplary example, the pressure within the interior of the reflector can be about 0.001 atm or less. The vacuum can suppress an evaporation and/or oxidation of the radiation emitter 1031 and expand a life span of the infrared lamp. The vacuum can also prevent a thermal convection or a thermal conduction between the radiation emitter and the optical element and/or reflector. In some instances, the interior of the reflector can be filled with an amount of non-oxidizing gas while still maintaining a certain level of vacuum to reduce an increase in a temperature of the air inside the space formed by the inner surface of optical element and coated reflector, which increase in temperature being caused by thermal convection and conduction though minimal. Examples of the non-oxidizing gas can include nitrogen ($N_2$), helium (He), argon (Ar), neon (Ne), krypton (Kr), xenon (Xe), radon (Rn), and nitrogen ($N_2$). The existence of inert gas can further protect the material of the radiation emitter from oxidation and evaporation.

The optical element can be made from a material having a high infrared transmissivity. Examples of the material for optical element can include oxides (e.g., silicon dioxide), metal fluorides (e.g., calcium fluoride, barium fluoride), metal sulfide or metal selenide (e.g., zinc sulfide, zinc selenide), and crystals (e.g., crystalline silicon, crystalline germanium). Additionally or alternatively, either or both sides of the optical element can be coated with a material absorbing visible spectrum and ultraviolet spectrum, such that only wavelength in infrared range can pass through the optical element. The radiation not in the infrared spectrum can be filtered out (e.g., absorbed) by the optical element. The infrared transmissivity of the optical element can be at least 95% (e.g., 95% of the incident radiation in infrared spectrum transmits through the optical element), 95.5%, 96.0%, 96.5%, 97.0%, 97.5%, 98.0%, 98.5%, 99%, 99.1%, 99.2%, 99.3%, 99.4%, 99.5%, 99.6%, 99.7%, 99.8%, 99.9% or higher, in an exemplary example, the infrared transmissivity of the optical element can be 99%.

The optical element can filter out (e.g., absorb) a radiation having a particular wavelength or a radiation having a predetermined range of wavelength from the radiation reflected by the reflector. For instance, the optical element can selectively remove visible light spectrum and/or ultraviolet spectrum from the arriving radiation, such that only radiation in the infrared spectrum can be directed to the user's hair. In an exemplary example, the radiation emitter can emit a radiation having a wavelength from 0.4 µm to 20 µm, the reflector can reflect all the radiation toward the optical element (e.g., no radiation is absorbed at the reflecting surface), and the optical element can filter out any visible spectrum wavelength of 0.4 µm to 0.7 µm from the reflected radiation, leaving only radiation in infrared spectrum exiting the infrared lamp.

The optical element can be shaped to converge or diverge the arriving radiation in a predetermined direction or to reduce a divergence angle of the arriving radiation beam. The optical element can be a convex lens, a concave lens, a set of convex lenses and/or concave lenses, or a Fresnel lens. For instance, if a conductive resistor, a ceramic heater or an LED is used as the radiation emitter, the optical element can be configured to converge the reflected radiation in a predetermined direction with a predetermined convergency angle to form a radiation spot having a predetermined shape and a predetermined size at a predetermined distance in front of the hair dryer. For instance, if a laser device is used as the radiation emitter, the optical element can be configured to diverge the generated radiation beam in a predetermined direction with a predetermined divergency angle to increase an area on the user's hair that is radiated by the infrared radiation.

A temperature increase at the optical element can be minor. A content of visible spectrum and ultraviolet spectrum in the radiation emitted by the radiation emitter 1031 can be low. Depending on the material of the radiation emitter 1031, energy carried by radiation in visible spectrum and ultraviolet spectrum can account for less than 5%, 4.5%, 4%, 3.5%, 3%, 2.5%, 2%, 1.5%, 1%, 0.5%, 0.4%, 0.3%, 0.2% or 0.1% of total energy in the radiation emitted by the radiation emitter. In other words, only a minor fraction of radiation energy (e.g., the energy carried by radiation in visible spectrum and ultraviolet spectrum) emitted by the radiation emitter 1031 can be absorbed by the optical element to cause a temperature increase. A temperature increase at the optical element can be further suppressed by the vacuum in the interior of the reflector (e.g., the space enclosed by the optical element and the reflecting surface of the reflector), which vacuum prevents a thermal convection or a thermal conduction between the radiation emitter and the optical element. In some instances, a portion of the airflow can be introduced from the airflow channel onto an outer surface of the optical element (e.g., blowing across the optical element), such that a temperature of the optical element and a surrounding area can be maintained substantially unchanged during an operation of the infrared lamp. As a result, an increase in temperature of the optical element can be minor even if a temperature of the radiation emitter is high.

A thermal insulating material (e.g., fiberglass, mineral wool, cellulose, polyurethane foam, or polystyrene) can be interposed between the radiation emitter and the reflector, such that the radiation emitter is thermally insulated from the reflector. The thermal insulation can keep a temperature of the reflector not increase even if a temperature of the radiation emitter is high. A thermal insulating material can also be interposed between a periphery of the optical element and the reflector, such that the optical element is thermally insulated from the reflector.

As discussed hereinabove, the temperature on the external surface of the reflector is substantially not increased by the radiation generated by the radiation emitter even if the radiation emitter is energized. The suppression of temperature increase in the temperature on the external surface of the reflector can be achieved by a high reflectivity of coating material on the reflecting surface of the reflector, a vacuum within the interior of the reflector, a high infrared transmissivity of the optical element, a thermal insulation between the radiation emitter and the reflector as well as between the optical element and the reflector, or a combination thereof. As a result, the airflow is substantially not heated by the infrared lamp while traveling through the airflow channel and exiting the hair dryer. An increase in temperature of the airflow caused by the infrared lamp can be less than 5 degrees centigrade (° C.), 4.5° C., 4.0° C., 3.5° C., 3.0° C., 2.5° C., 2.0° C., 1.5° C., 1.0° C., 0.5° C., 0.1° C. or less. In an exemplary example, an increase in temperature of the airflow caused by the infrared lamp can be less than 3° C. In other words, the radiation generated at the infrared lamp does not substantially account for the increase in temperature of the airflow.

Those skilled in the art can appreciate that, a temperature of the airflow may be inevitably increased to some extent by electric components in the hair dryer such as circuits, electrical wires, power leads, power adaptor and controller. For instance, an increase in temperature of the airflow traveling through the entire airflow channel can be no more than 20° C., 19° C., 18° C., 17° C., 16° C., 15° C., 14.5° C., 14.0° C., 13.5° C., 13.0° C., 12.5° C., 12.0° C., 11.5° C., 11.0° C., 10.5° C., 10.0° C., 9.5° C., 9.0° C., 8.5° C., 8.0° C. 7.5° C., 7.0° C., 6.5° C., 6.0° C., 5.5° C., 5.0° C. or less. In an exemplary example, the room temperature is 25° C., and an increase in temperature of the airflow travelling through the entire airflow channel of the hair dryer of the disclosure is at most 15° C. resulting in a temperature of airflow at the airflow outlet at most 40° C., which is much lower than the temperature of the airflow blowing out of a conventional hot air-based hair dryer. In a comparative example, the temperature of the airflow blowing out of a conventional hair dryer No. 1 (Dyson@ HD01) is about 140° C. In another comparative example, the temperature of the airflow blowing out of a conventional hair dryer No. 2 (Panasonic@ EH-JNA9C) is about 10° C. In the comparative example, if cutting off a power supply to the nichrome wire heater, the temperature of the airflow blowing out of the conventional hair dryer No. 1 is about 36° C. in a condition of the room temperature being 27° C. (e.g., the airflow is heated up by about 9° C. by those electric components other than the nichrome wire heater).

The temperature of airflow arriving at the user's hair can be lower than the temperature measured at the airflow outlet of the hair dryer due to a heat dissipation in the air. In an exemplary example, the airflow temperature at 10 cm in front of the airflow outlet of the hair dryer of the disclosure is about 28° C. under a condition that the room temperature being 25° C. and the temperature of airflow at the airflow outlet being about 40° C. In the comparative example, the airflow temperature at 10 cm in front of the airflow outlet of the conventional hair dryer No. 1 is about 74.4° C. under a condition that the room temperature being 25° C. and the temperature of airflow at the airflow outlet being about 140° C.

The relative cool airflow (e.g., at room temperature) can be beneficial in drying and styling user's hair. For instance, frizz, dry and damaged hair can be avoided, which otherwise may occur with conventional hair dryer blowing a hot airflow. Another benefit of the cool airflow is that, the hair dryer can be equipped with various sensors which otherwise do not work under a high temperature. The sensors can comprise a temperature sensor, a proximity/range-finding sensor and/or a humidity sensor. The sensors can be positioned, for example, at an airflow outlet side of the housing to monitor a status the user's hair (e.g., degree of humidity). An area within which the airflow being applied onto the hair can substantially encompass an area of infrared radiation on the hair (e.g., the radiation spot). The airflow can accelerate an evaporation of the heated water from the hair by blowing away the humid air surrounding the hair. The airflow can also decrease a temperature of the hair radiated by the infrared radiation to avoid a hair damage. A temperature of the hair and water on the hair has to be maintained at an appropriate range to accelerate an evaporation of water from hair while keeping the hair not too hot. The appropriate temperature range can be 50 to 60 degrees centigrade. A velocity of the airflow blowing onto the hair can be regulated to maintain the temperature of the hair within the appropriate temperature range, for example by blowing away heated water and excess heat. A proximity/range-finding sensor and a temperature sensor can operate collectively to determine the temperature of the hair and regulate the velocity of the airflow via a feedback loop control to maintain a constant or programmed temperature of the hair.

Figure 6:
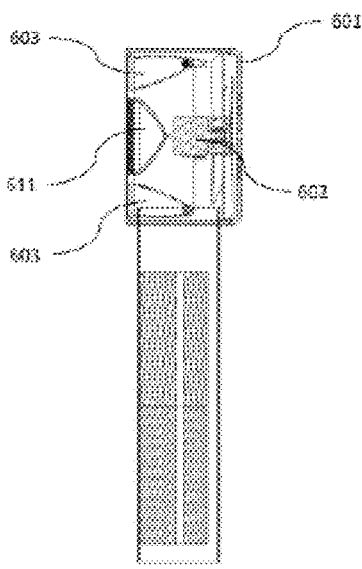
FIG. 6 is a cross-sectional view showing another exemplary hair dryer in accordance with embodiments of the disclosure.
Figure 7:
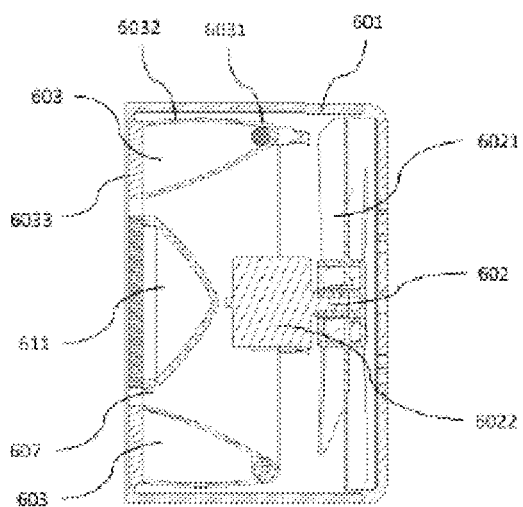
FIG. 7 is an enlarged cross-sectional view showing an airflow generating element and a radiation energy source in another exemplary hair dryer in accordance with embodiments of the disclosure.

FIG. 6 is a cross-sectional view showing another exemplary hair dryer in accordance with embodiments of the disclosure. FIG. 7 is an enlarged cross-sectional view showing body of the hair dryer of FIG. 6. The hair dryer can be powered by an external power source and/or embedded batteries. The hair dryer can comprise a housing 601. The housing can include a body and a handle. An airflow generating element 602, a radiation energy source 603 and various other electric and mechanical components can be received in the housing. The radiation energy source 603 can be configured to generate and direct heat energy toward user's hair. The airflow generating element 602 can be configured to generate an airflow passing through an airflow channel provided in the housing.

Figure 8:
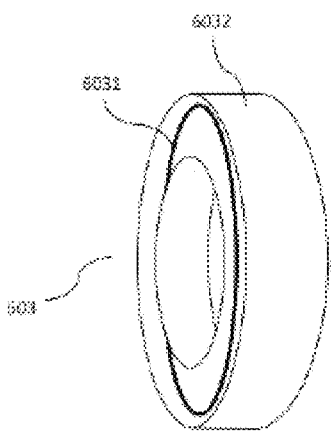
FIG. 8 is a schematic showing another exemplary radiation energy source in accordance with embodiments of the disclosure.

The airflow generating element 602 can comprise an impeller 6021 driven by a motor 6022. The generated airflow can be pushed through the airflow channel 607 to an exterior of the hair dryer. The radiation energy source 603 can be an infrared lamp having a substantially ring shape. As schematically shown in FIG. 8, the ring-shaped radiation energy source 603 can comprise a substantially ring-shaped reflector 6032 and a substantially ring-shaped radiation emitter 6031 positioned within an interior of the reflector. The radiation emitter can be a filament having a substantially ring shape. The radiation emitter 6031 can also comprises a plurality of sections which collectively form a substantially ring shape. The radiation emitter can be configured to emit a radiation within a predetermined wavelength range. In some instances, the radiation emitted by the radiation emitter can substantially cover visible spectrum and infrared spectrum. The reflector 6032 can have an opening directed to an exterior of the hair dryer.

The radiation emitted from the radiation emitter can be reflected by a reflecting surface (e.g., inner surface) of the reflector 6032 toward user's hair. A divergency angle of the reflected radiation beam can be reduced by the reflecting surface to concentrate the reflected radiation energy within a radiation spot having a predetermined shape and a predetermined size at a predetermined distance in front of the hair dryer. A cross section of the reflecting surface of the reflector can be parabolic. The radiation emitter 6031 can be positioned at a focal point of the parabolic reflecting surface of the reflector (e.g., parabola) or offset the focal point of the parabola. A position of the radiation emitter in the reflector can be adjustable by a movement of the radiation emitter with respect to the reflector. The reflecting surface of the reflector can be coated with a coating material having a high reflectivity to a wavelength range of radiation generated by the radiation emitter, such that substantially all the radiation emitted by the radiation emitter can be reflected toward the user's hair. As a result, a temperature on an external surface of the reflector is substantially not increased by the radiation from the radiation emitter because substantially no energy is absorbed by the reflecting surface of the reflector.

A substantially ring-shaped optical element 6033 can be provided at the opening of the reflector. The optical element can remove (e.g., absorb) a radiation having a predetermined range of wavelength from the radiation reflected by the reflector. For instance, the optical element can selectively remove visible light spectrum and/or ultraviolet spectrum from the reflected radiation, such that only radiation in the infrared spectrum can be directed to the user's hair. The interior of the reflector can be configured to have a degree of vacuum to prevent a thermal convection or a thermal conduction between the radiation emitter and the optical element and/or reflector. In some instance, the interior of the reflector can be filled with an amount of inert gas to prevent the radiation emitter from oxidation and/or evaporation. As discussed hereinabove, a temperature of the airflow is substantially not increased by the infrared lamp while traveling through the airflow channel, and the relative cool airflow can be beneficial in drying and styling user's hair.

As illustrated in FIG. 6 and FIG. 7, a dimension of the housing in an axial direction (e.g., the direction from the airflow generating element to the opening of the infrared lamp, which is shown in FIG. 6 and FIG. 7 as a horizontal direction) can be further reduced as a result of the ring-shaped infrared lamp configuration. For instance, at least a portion of the airflow generating element can be received in a space encompassed by the ring-shaped infrared lamp, resulting in a shortened airflow channel in the axial direction. A chamber 611 can be positioned in the space encompassed by the infrared lamp. An opening of the chamber can direct toward the user's hair. The opening can be covered by a transparent sealing member (e.g., $SiO_2$ glass). The opening can be covered by a colored sealing member (e.g., a coated $SiO_2$ glass) for an aesthetic appearance. The chamber can be provided to accommodate various components such as sensors. Examples of the sensors can comprise a temperature sensor, a proximity/range-finding sensor, and a humidity sensor. A wall of the chamber can be made from electrically and/or thermal insulting material. A temperature in the chamber can be maintained at room temperature to improve an accuracy in measurement of the sensors, since the airflow flowing through the airflow channel is substantially not heated by the infrared lamp, as discussed herein above.

Figure 9:
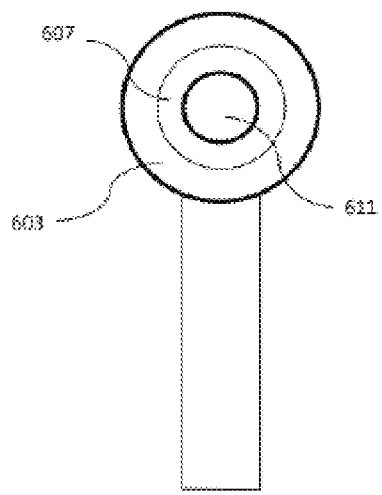
FIG. 9 is a lateral view showing an appearance of another exemplary hair dryer in accordance with embodiments of the disclosure.

In the exemplary example shown in FIG. 6 and FIG. 7, the airflow outlet of the airflow channel 607 can be positioned between the infrared lamp 603 and the chamber 611. FIG. 9 shows a lateral view of the hair dryer of FIG. 6 and FIG. 7, where the chamber is centrally positioned while the airflow out of the airflow channel 607 is encompassed by the infrared lamp 603. Though not shown, in alternative embodiments, the airflow outlet of the airflow channel 607 can be positioned between the housing 601 and the infrared lamp 603 to form a configuration where the infrared lamp is encompassed by the airflow out of the airflow channel.

Figure 10:
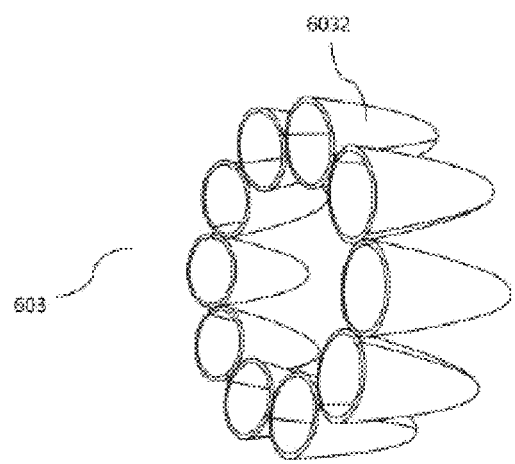
FIG. 10 is a schematic showing still another exemplary radiation energy source in accordance with embodiments of the disclosure.
Figure 11:
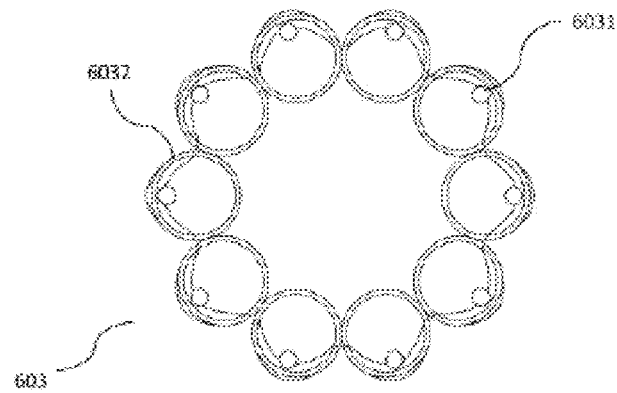
FIG. 11 is a cross-sectional view showing the exemplary radiation energy source of FIG. 10 in accordance with embodiments of the disclosure.

The radiation energy source 603 in FIG. 6 and FIG. 7 can alternatively or additionally comprise a plurality of infrared lamps. The plurality of infrared lamps can be arranged along a contour of any geometry, such as a ring, a triangle, a square or a sector. FIG. 10 and FIG. 11 schematically illustrate the radiation energy source 603 having a plurality of infrared lamps arranged along a ring. Each of the plurality of infrared lamps can have substantially the same configuration as described hereinabove with reference to FIG. 3. For instance, each of the plurality of infrared lamps can comprise a reflector 6032 having an opening directed to an exterior of the hair dryer, an optical element abuts against an opening of the reflector, and a radiation emitter 6031 positioned within an interior of the reflector. The reflecting surface of the reflector can be coated with a coating material having a high reflectivity to the wavelength range of radiation generated by the radiation emitter. The optical element can remove radiation having a predetermined wavelength or wavelength range, such as radiation in visible light spectrum and/or ultraviolet spectrum.

Figure 12:
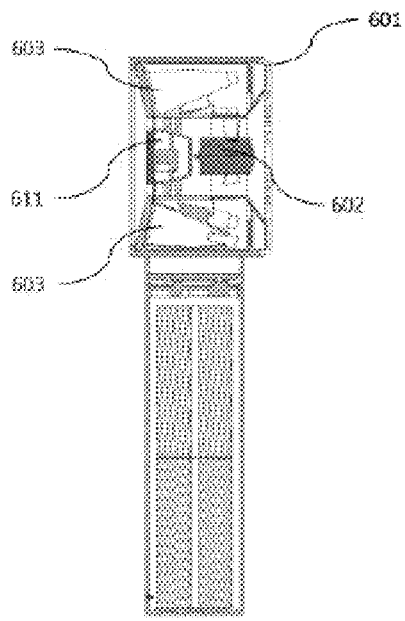
FIG. 12 is a cross-sectional view showing still another exemplary hair dryer in accordance with embodiments of the disclosure.

A cross section of a reflecting surface of each reflector can be parabolic. A divergence angle of the reflected beam of radiation can be reduced by the parabolic reflector of each infrared lamp. A shape of the radiation emitter and a shape of the reflector can be optimized using an optical simulation software to maximize the radiation output at a desired distance exterior to the hair dryer. An axis of the respective parabolic reflecting surface of the reflector in the plurality can be substantially parallel with each other. The axis of a parabola can refer to an axis of symmetry of the parabola that is a vertical line passing through the vertex of the parabola and dividing the parabola into two congruent halves. An axis of the respective parabolic reflecting surface of the reflector in the plurality infrared lamps can also intersect with each other, as shown in FIG. 11 in combination with FIG. 12. The angle of intersection between the axis of the respective parabolic reflecting surface of the reflector in the plurality of infrared lamps can be adjustable, for example by changing a tilting angle of one or more infrared lamps with respect to axial direction of the housing of the hair dryer. In the exemplary example illustrated, the airflow can be thermally isolated from the plurality of infrared lamps. The airflow is not heated by the radiation generated by the infrared lamps. In some examples, one or more infrared lamps or other types of radiation energy sources, can share one common optical element.

The infrared radiation exiting the plurality of infrared lamps can at least partially overlap at a predetermined distance in front of the hair dryer, such that a radiation spot having a predetermined shape and size can be formed. The radiation spot can have, for example, a circular shape. In an exemplary example, a circular spot having a diameter of about 10 centimeters can be formed at a distance of about 10 centimeters in front of the hair dryer. The shape and/or size of the radiation spot at a certain distance in front of the hair dryer can be adjusted by regulating at least one of a size (e.g., diameter) of respective infrared lamp, an offset of radiation emitter from the focal point of the respective reflector, an angle of intersection between the axis of the respective reflector, and an optical property of the optical element of respective infrared lamp. The radiation spot can accounts for at least 50%, 55%, 60%, 65%, 70%, 75%, 80%, 85%, 90%, 95% or more of the total energy carried by the infrared radiation emitted from respective one of the plurality of infrared lamps. An average power density in the radiation spot can be at least $1\times10^3$, $2\times10^3$, $3\times10^3$, $4\times10^3$, $5\times10^3$, $6\times10^3$, $7\times10^3$, $8\times10^3$, $9\times10^3$, $1\times10^4$, $2\times10^4$, $3\times10^4$, $4\times10^4$, $5\times10^4$, $6\times10^4$, $7\times10^4$, $8\times10^4$, $9\times10^4$, $1\times10^5$ watt per square meter ($W/m^2$) or more.

Though not shown, the plurality of infrared lamps can also be arranged in an array of any shape. The plurality of infrared lamps arranged in an array can be coplanar or not. For instance, the plurality of infrared lamps can also be arranged to cover an area having any geometry such as a circle, a triangle, a square or a sector. An offset of the radiation emitter from the focal point of respective reflector and an angle of intersection between the axis of the respective reflector in the arrayed plurality of infrared lamps can have substantially same configuration as those described hereinabove with reference to FIG. 10 and FIG. 11. For instance, the infrared radiation emitted from respective one of the arrayed infrared lamps can overlap at a predetermined distance in front of the hair dryer to form a radiation spot having a desired size and power density. The plurality of infrared lamps, either arranged as a ring or an array, are not necessarily positioned continuously. For example, it is also possible to replace any one of the plurality of infrared lamps shown with a sensor or other component or leave some position along the ring or in the array blank, as long as a radiation spot having desired average energy density is generated at the hair.

The plurality of infrared lamps can be positioned at either an inner side or an outer side of the ring-shaped airflow outlet of the airflow channel. For instance, the plurality of infrared lamps can be positioned to encompass the airflow outlet or to be encompassed by the airflow outlet when viewed from a lateral side of the hair dryer. The plurality of infrared lamps can also be positioned apart from the airflow outlet of the airflow channel. For instance, an area covered by the plurality of infrared lamps may not overlap with an area covered by the airflow outlet when viewed from a lateral side of the hair dryer. A chamber can be provided, for example, in the space encompassed by the infrared lamp. A transparent sealing member can be covered on an opening of the chamber, which opening directing to an exterior of the hair dryer. The chamber can be provided to receive therein various components such as sensors. A temperature in the chamber can be maintained at room temperature to improve an accuracy in measurement of the sensors, since the airflow flowing through the airflow channel is substantially not heated by the infrared lamp.

The hair dryer of the disclosure can have a reduced dimension at least in a axial direction (e.g., the horizontal direction shown in FIG. 1 and FIG. 6) as compared with conventional designs. In an example, an infrared lamp having a compact size can be utilized as the radiation energy source. Therefore, a conventional heater cavity receiving a grid of nichrome wire is not provided in the hair dryer of the disclosure. By utilizing the ring-shaped infrared lamp or the plurality of infrared lamps arranged along a ring, a dimension of the hair dryer in the axial direction can be further reduced as described hereinabove. The hair dryer can comprise a housing having a body and a handle. The body can have a dimension no more than 25, 24, 23, 22, 21, 20, 19, 18, 17, 16, 15, 14, 13, 12, 11, 10, 9, 8, 7, 6, 5 or 4 centimeters in at least one direction thereof, for example an axial direction and a radial direction (e.g., the direction perpendicular to the plane of FIG. 1 and FIG. 6). In an exemplary example, the body can have a dimension no more than 10 centimeter in at least one direction. In a further exemplary example, the body can have a dimension no more than 8 centimeters in at least one direction. In a further exemplary example, the body can have a dimension no more than 6.5 centimeters in at least one direction. The body can have a dimension no more than 25, 24, 23, 22, 21, 20, 19, 18, 17, 16, 15, 14, 13, 12, 11, 10, 9, 8, 7, 6, or 5 centimeters in any direction thereof. In an exemplary example, the body can have a dimension no more than 8 centimeters in any direction thereof. In another exemplary example, the body can have a dimension no more than 6.5 centimeters in any direction thereof.

The hair dryer of the disclosure can have a reduced weight. A radiation energy source having a light weight can be utilized as the source of heat energy, instead of the conventional heavy nichrome wires or rods. The hair dryer can comprise a housing having a body and a handle. The hair dryer can be operated by either one or more batteries received within the handle or an external power source. The handle can be detachable from the body of the housing. The hair dryer, including the one or more batteries, can have a weight no more than 1500, 1450, 1400, 1350, 1300, 1250, 1200, 1150, 1100, 1050, 1000, 950, 900, 850, 800, 750, 700, 650, 600, 550, 500, 450, 400, 350 or 300 grams, in an exemplary example, the hair dryer, including the one or more batteries, can have a weight no more than 800 grams. In an exemplary example, the hair dryer, including the one or more batteries, can have a weight no more than 600 grams. In a further exemplary example, the body of hair dryer, excluding the handle, can have a weight no more than 300 grams. In a still further exemplary example, the body of hair dryer, excluding the handle, can have a weight no more than 250 grams. The user can therefore easily hold and operate the hair dryer during the process of drying the hair.

The hair dryer of the disclosure can have a reduced power consumption. A radiation energy source such as an infrared lamp can be utilized as the source of heat energy in the hair dryer of the disclosure. A ratio of effective energy transferred to the user's hair and water on the hair in the total radiation energy generated by the infrared lamp can be at least 80% because a majority of the radiation generated by the infrared lamp is in the infrared spectrum, as discussed hereinabove. In addition, the heat carried by the infrared energy can be directly transferred and applied to the hair and water on the hair in a radiation heat transfer manner, resulting in an improved heat transfer efficiency. In an exemplary example, about 90% of the radiation generated by the infrared lamp is in the infrared spectrum. A small percentage of the infrared energy may be lost at the reflector and the optical element, while most of the infrared energy arrives at the user's hair in al heat radiation manner, resulting in a ratio of effective energy more than 80%. In the conventional nichrome wire-based hair dryer where a convective heat transfer is utilized, however, the ratio of effective energy and heat transfer efficiency is much lower, because most of the heat is absorbed by surrounding air prior to arriving at the user's hair. In a testing experiment with conventional hair dryer No. 1 (Dyson@ HD01), the air temperature at airflow outlet is around 140° C., however the temperature of airflow drops to 74° C. at a distance of 10 cm from the hair dryer, and 60° C. at a distance of 20 cm from the hair dryer. The rapid drop in temperature of airflow in the convective heat transfer manner is caused by the fact that some of the heat is absorbed by the surrounding air prior to arriving at the hair. If the room temperature is 25° C., then at least 50% of the energy carried by the hot airflow is lost before reaching the hair. After reaching the hair, a portion of hot air is reflected to various directions without contributing in heating the hair or water on the hair, leading to a low ratio of effective energy and heat transfer efficiency.

In an exemplary example, the hair dryer of the disclosure can be operated with one or more embedded batteries. The battery can have a total capacity of at least 50, 55, 60, 65, 70, 75, 80, 85, 90 Watt-hour (Wh, for example, 100 Watt-hour battery can deliver 100 watt power for 1 hour or 20 watt power for 5 hours). In a testing experiment, the battery having a total capacity of 66.6 Wh can effect a continuous operation of the hair dryer about 20 minutes at a total power output (e.g., the total power output of all electricity-consuming components, includes the motor, the infrared lamp and any circuits) of 200 W or 13 minutes at a total power output of 350 W, which operation time is sufficient to dry a user's hair completely.

The hair dryer of the disclosure can provide a strong airflow which accelerates an evaporation of water from the hair. As compared with conventional nichrome wire-based hair dryers, the airflow generated by the airflow generating element can travel along the airflow channel without passing through the grid of nichrome wire and thus not being decelerated, resulting in an output airflow having an increased velocity blowing out of the hair dryer. A velocity of the output airflow can be at least 10, 11, 12, 13, 14, 15, 16, 17, 18, 19, 20, 21, 22, 23, 24 or 25 m/s. In an exemplary example, the velocity of the output airflow can be at least 18 m/s. The airflow blowing onto the hair can decrease the temperature of hair and water on the hair by removing excessive heat; otherwise, the hair can be damaged under a high temperature caused by the infrared radiation. As discussed hereinabove, an evaporation of water from hair can depend on both a temperature of hair and water on the hair and a relative humidity of air surrounding the hair. An appropriate temperature range for drying the hair is 50 to 60 degrees centigrade, in which range a water evaporation and a hair health can be balanced. The velocity of the output airflow blowing onto the hair can be regulated to maintain the temperature of the hair and water on the hair within the appropriate temperature range to induce a water evaporation, and in the meantime, the airflow takes away excessive heat from the hair can create a local environment surrounding the hair with lower relative humidity to accelerate the evaporation.

In passing through the airflow channel, the temperature of the airflow is substantially not increased by the radiation generated at the infrared lamp, as discussed hereinabove. The relative cool airflow can be beneficial to a health of hair in drying and styling user's hair. In addition, the hair dryer can be equipped with various sensors which otherwise do not work under a high temperature.

Figure 13:
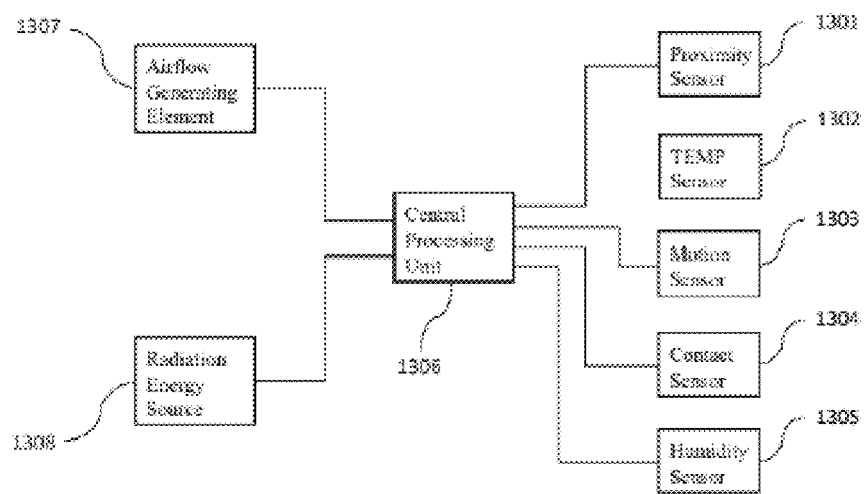
FIG. 13 is a schematic showing a sensor configuration in the hair dryer in accordance with embodiments of the disclosure.

The hair dryer of the disclosure can be provided with one or more sensors configured to measure at least one of a parameter of the hair, an operation of the hair dryer, and/or a surrounding environment in which the hair dryer operates. A central processing unit can be provided either onboard the hair dryer or offboard the hair dryer (e.g., remote device, on the cloud) to regulate an operation of the hair dryer. Examples of regulating an operation of the hair dryer may include regulating an operation of one or more of the airflow generating element and the radiation energy source based on a measurement received from the one or more sensors. Examples of the sensors can include, but not limited to, a proximity sensor, a temperature sensor, an optical sensor, a motion sensor, a contact sensor, and a humidity sensor. The sensors can be positioned at the housing of the hair dryer, embedded into the housing of the hair dryer, disposed on a circuit of the hair dryer, provided within the hair dryer (e.g., within the chamber which is be positioned in the space encompassed by the infrared lamps, as described elsewhere in the disclosure). As shown in FIG. 13 which is a schematic showing a sensor configuration in the hair dryer in accordance with embodiments of the disclosure, the sensors 1301-1305 can be in communication with the central processing unit 1306 via a wired or wireless link. The central processing unit can also be in communication with other components of the hair dryer, for example the airflow generating element 1307 and the radiation energy source 1308, such that a regulation on operation of the component based on sensor measurement can be implemented.

In an exemplary embodiment, the one or more sensors can include a proximity sensor configured to measure a proximity of the hair dryer to the user's hair being radiated with the infrared radiation. In an example, the proximity sensor can be an infrared Time-of-Flight (TOF) sensor that measures a time interval for an emitted infrared light to return to the sensor and determines the distance between the sensor and the target object based on time interval. A spectrum of the infrared TOF sensor can be different from that of the infrared radiation emitted from the radiation energy source. In another example, the proximity sensor can be an ultrasonic sensor that measures a distance to the target object by emitting an ultrasonic pulse. In still another example, the proximity sensor can be an millimeter-wave radar. In still another example, the proximity sensor can be implemented with a binocular or monocular camera that determines a distance to a target object by a distance measurement algorithm. The proximity sensor can be provided at the housing of the hair dryer, for example in proximity to the airflow outlet of the airflow channel. The proximity sensor can also be provided in a space encompassed by the plurality of infrared lamps, as shown in FIG. 10 and FIG. 11. The proximity sensor can be configured to measure a distance of 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 22 cm, 24 cm, 26 cm, 28 cm, 30 cm, 35 cm, 40 cm, 45 cm, 50 cm, 60 cm, 70 cm, 80 cm, 90 cm, or 100 cm from the hair dryer to the hair with an error of less than 5%, 4%, 3%, 2%, or 1%. In an example, the proximity sensor can measure 10 cm distance from the hair dryer to the hair an accuracy/precision of ±0.1 cm. A measurement accuracy/precision of the proximity sensor may not be adversely affected by the airflow generated by the airflow generating element since the airflow is substantially not heated by the radiation energy source, as discussed hereinabove in the disclosure.

In the exemplary embodiment, the measurement received from the one or more sensors can be indicative of a proximity of the hair dryer to the hair radiated with the radiation energy source being less than a predetermined distance. As discussed hereinabove in the disclosure, a radiation spot can be formed on the user's hair with the infrared radiation from the radiation energy source. The radiation spot can have a predetermined size at a predetermined distance in front of the hair dryer as a result of a divergence of the infrared radiation. For instance, a size of the radiation spot can be smaller and an average power density in the radiation spot can be higher if the hair dryer is getting closer to the user's hair. A higher average power density in the radiation spot can result in a higher hair temperature within the radiation spot. However, an unreasonably high temperature can damage the hair and therefore shall be avoided. The central processing unit can be configured to send an alert to the user, decrease a total power output of the radiation energy source and/or increase a velocity of airflow from the airflow generating element if a proximity of the hair dryer to the hair is detected less than a predetermined distance (e.g., 10 cm), such that a heat damage of the hair can be prevented. In an exemplary example where the radiation energy source comprises a plurality of infrared lamps as shown in FIG. 10 and FIG. 11, decreasing a total power output of the radiation energy source can comprise switching off one or more infrared lamps in the plurality of infrared lamps.

The measurement received from the one or more sensors can also be indicative of a proximity of the hair dryer to the hair radiated with the radiation energy source being more than a predetermined distance. An optimal distance from the hair dryer to the hair can be determined based at least on an output power of the radiation energy source, a power of the airflow generating element and/or an attribute of the hair (e.g., long or short, wetness, curl or straight, etc). An efficiency in drying the hair cats be optimal if the distance from the hair dryer to the hair is maintained at the optimal distance. The central processing unit can be configured to increase a total power output of the radiation energy source and/or decrease a velocity of airflow from the airflow generating element if a proximity of the hair dryer to the hair is detected more than a predetermined optimal distance, such that an effectiveness in drying the hair can be optimized.

In another exemplary embodiment, the one or more sensors can include a temperature sensor. A temperature sensor can be provided to various components of the hair dryer to measure an operating temperature of the components. A temperature sensor can also be provided to measure the temperature of the hair. A temperature sensor can also be provided to measure the temperature of the surrounding environment. In an exemplary embodiment, the temperature sensor can be thermally coupled to the exterior surface of the radiation energy source. For instance, the temperature sensor can be positioned at or in proximity to an exterior surface of the radiation energy source. The temperature sensor can be either a negative temperature coefficient (NTC) thermistor, a resistance temperature detector (RTD), a thermocouple, or a semiconductor-based sensor. The measurement received from the one or more sensors can be indicative of an operation status of the hair dryer. In an example, the measurement received from the one or more sensors can be indicative of a malfunction of the radiation energy source. As discussed in the disclosure, a space between an outer surface of the infrared lamp and an inner surface of the infrared lamp enclosure as well as an interior of the infrared lamp can be maintained with a degree of vacuum. A temperature at the exterior surface of the infrared lamp can increase rapidly if the vacuum is not correctly maintained due to, for example, a leakage of air through a failed sealing member. The malfunction of the infrared lamp can include a temperature at or in proximity to an exterior surface of the infrared lamp being higher than a predetermined temperature, an increase in temperature at or in proximity to an exterior surface of the infrared lamp being larger than a predetermined value, or a rate in temperature increase at or in proximity to an exterior surface of the infrared lamp being larger than a predetermined rate. The central processing unit can be configured to send an alert to the user and/or switch off the radiation energy source if a malfunction is detected at the radiation energy source. In an example, a multi-stage warning mechanism can be provided where an alert is first sent to the user if the temperature at the exterior surface of the infrared lamp exceeds a first threshold, and the infrared lamp is switched off if the temperature at the exterior surface of the infrared lamp exceeds a second threshold which is higher than the first threshold.

In still another exemplary embodiment, the one or more sensors can include a temperature sensor that is thermally coupled to the airflow generating element. For instance, a temperature sensor can be coupled to the motor which drives the impeller. The temperature sensor can be coupled to either an exterior surface or a rotor of the motor to detect an operating temperature of the motor. The temperature sensor can also be provided at an outlet of the airflow channel to measure a temperature of the airflow. For instance, an abnormally highly temperature at the motor or the airflow can indicate a malfunction of the motor. In the exemplary embodiment, the measurement received from the one or more sensors can be indicative of a temperature of the motor being higher than a predetermined temperature. The central processing unit can be configured to send an alert to the user, decrease a total power output of the airflow generating element and/or switch off the airflow generating element if a temperature of the motor is higher than a predetermined temperature. In an example, a multi-stage warning mechanism can be provided where a total power output of the motor is decreased (e.g., decreasing a rotating speed of the motor) if the temperature at the motor exceeds a first threshold, and the motor is switched off if the temperature at the motor exceeds a second threshold which is higher than the first threshold.

In still another exemplary embodiment, the one or more sensors can include an Inertial Measurement Unit (IMU) which is configured to measure a movement and/or an attitude/orientation of the hair dryer. In some instances, exposing an object or a portion of an object to the infrared radiation shall be avoided to prevent a damage to the object or a safety issue. For instance, the hair temperature can increase rapidly if the hair is subject to continuous exposure to infrared radiation and water on the hair is already removed, which high temperature may cause heat damage to the hair. For instance, the hair dryer can often be used to dry objects other than hair, for example a cloth. In drying a cloth, the hair dryer can often be placed stationary with respect to a supporting member. Therefore, it would be desirable to switch off the hair dryer if the hair dryer is maintained stationary over a predetermined time duration. In the exemplary embodiment, the measurement received from the one or more sensors can be indicative of an attitude of the apparatus being maintained unchanged for a time duration more than a predetermined duration threshold. The central processing unit can be configured to send an alert to a user of the hair dryer, increase a velocity of airflow from the airflow generating element, decrease an output power of the radiation energy source, and/or switch off the radiation energy source. In an example, a multi-stage warning mechanism can be provided where an alert can be sent to the user if an attitude of the hair dryer is maintained unchanged for a first duration threshold, a velocity of airflow from the airflow generating element is increased and/or an output power of the radiation energy source is decreased if an attitude of the hair dryer is maintained unchanged for a second duration threshold which is larger than the first duration threshold, and the radiation energy source is switched off if an attitude of the hair dryer is maintained unchanged for a third duration threshold which is larger than the second duration threshold.

In still another exemplary embodiment, the one or more sensors can include a sensor which is configured to determine the user's contact on the hair dryer (e.g., user holding the handle). In an example, a proximity sensor can be provided to the hair dryer, for example at the handle thereof. A signal can be generated to confirm the user's contact if the user holds the handle and touches the proximity sensor. The hair dryer may not operate if the user does not properly hold the handle. In the exemplary embodiment, the measurement received from the one or more sensors can be indicative of the hair dryer not being held by a user. The central processing unit can be configured to send an alert to the user, increase a velocity of airflow from the airflow generating element, decrease an output power of the radiation energy source, and/or switch off the radiation energy source and/or the airflow generating element.

In still another exemplary embodiment, the one or more sensors can include a hair temperature sensor configured to measure a temperature of user's hair being radiated with the infrared radiation from the radiation energy source. In an example, the hair temperature sensor can be an infrared temperature sensor. The hair temperature sensor can be provided at the housing of the hair dryer, for example in proximity to the airflow outlet of the airflow channel. The hair temperature sensor can also be provided in a space encompassed by the plurality of infrared lamps, as shown in FIG. 10 and FIG. 11. In the exemplary embodiment, the measurement received from the one or more sensors can be indicative of the temperature of the hair being higher than a predetermined temperature. The central processing unit can be configured to send an alert to a user, decrease a total power output of the radiation energy source, and/or increase a velocity of airflow from the airflow generating element, such that a heat damage of the user's hair can be prevented.

In still another exemplary embodiment, the one or more sensors can include a humidity sensor configured to measure a humidity of a surrounding environment in which the hair dryer is operated. In some instances, in order to effectively dry the hair, the power output of the radiation energy source can be increased and/or a velocity of airflow from the airflow generating element can be decreased if a humidity of a surrounding environment is high. The humidity sensor can be provided at the housing of the hair dryer, for example at the inlet of the airflow channel. In the exemplary embodiment, the measurement received from the one or more sensors can be indicative of the humidity of surrounding environment being higher than a predetermined humidity. The central processing unit can be configured to increase a total power output of the radiation energy source and/or decrease a velocity of airflow from the airflow generating element.

The sensors discussed hereinabove can be employed individually or collectively. The measurement from two or more sensors can be combined or fused. Data from one or more sensors can be processed within the context of one another. Data from one or more sensors may be weighted based on precision and/or reliability, etc.

Sensor data, which may include individual sensor data or combined sensor data, can be provided to the central processing unit which regulates an operation of the hair dryer. For instance, the central processing unit can be configured to determine a total output power of the radiation energy source and/or a velocity of the airflow from the airflow generating element based on at least one of the proximity of the hair dryer to the hair, the temperature of the hair being radiated with the infrared radiation, and the humidity of the surrounding environment. The central processing unit can determine a parameter of the radiation energy source and/or the radiation energy source by searching a predetermined lookup table. In an example, sensor measurement from the proximity sensor indicates the user is holding the hair dryer too close to the hair and sensor measurement from the hair temperature sensor indicates the hair temperature is greater than a predetermined healthy temperature, then the central processing unit can determine to decrease an output power of the radiation energy source and increase a velocity of the airflow from the airflow generating element, such that the hair temperature can be lowered to a value which is safe and healthy to hair. In another example, sensor measurement from the hair temperature sensor indicates the hair temperature is greater than a predetermined temperature and sensor measurement from the IMU indicates the hair dryer is stationary for a time longer than a predetermined time duration, then the central processing unit can determine to first send an alert to the user, and switch off the radiation energy source if the user does not move the hair dryer in a predetermined time duration.

The measurement from the one or more sensors can be stored in a data storage device which is either onboard the hair dryer or at a remote cloud. The data storage device can be a flash memory which retains data in the absence of a power supply. The data storage device can also store therein any system error data which can be read by an external device through a wired or wireless manner. In an example, a communication interface can be provided at the housing of the hair dryer (for example at the handle) to facilitate a reading out of the data from the data storage device. The sensor measurement and system error data, which is stored in the data storage device, can enable a maintenance personnel to locate any malfunctional component. The hair dryer can be prohibited to operate unless airy error code in the data storage device is cleared by an authorized maintenance personnel.

The hair dryer of the disclosure can be provided with a, feedback element configured to provide a tactile feedback based on a measurement received from the one or more sensors. The tactile feedback can include at least one of a visual, an auditory and a haptic feedback. In an example, the feedback element can include a light indicator, for example, one or more light emitting diodes (LED). The LEDs can be arranged in a ring at the housing (e.g., the handle or the body) of the hair dryer. The LEDs can provide various lighting pattern to indicate different status of the hair dryer. The lighting pattern can include at least one of a lighting frequency, a color, and a number of LED being switched on. For instance, the LEDs can flash at a first frequency to indicate a status where the hair dryer is not held by the user, and flash at a second and higher frequency to indicate a status where the hair dryer is maintained stationary for a time duration more than a predetermined duration threshold. In an example, the feedback element can include a vibrator. The vibrator can vibrate at different frequency and/or strength to indicate different status of the hair dryer. In an example, the feedback element can include a speaker or buzzer. In an example, no dedicate feedback element is provided to the hair dryer, however the motor (e.g., the airflow generating element) can drive the impeller at different speed or with different pattern to indicate different status of the hair dryer. For instance, in case the measurement from the proximity sensor indicates the user is holding the hair dryer too close to the hair, the motor can switch the rotating speed thereof between t high speed to a second low speed at a predetermined frequency, such that a vibrating-like effect can be generated to notify the user.

The disclosure also provides an apparatus for drying an object which generates a low noise. The apparatus can comprise a housing configured to provide an airflow channel having an airflow inlet and an airflow outlet, an airflow generating element contained in the housing and configured to effect an airflow through the airflow channel, a radiation energy source contained in the housing and configured to generate infrared radiation and direct the infrared radiation toward an exterior of the housing, and a power element configured to provide power at least to the radiation energy source and the airflow generating element. The airflow generating element can be positioned at a downstream of the airflow with respect to at least a portion of the power element. At least a portion of the radiation energy source can be located at a downstream of the airflow with respect to the airflow generating element. At least a portion of the radiation energy source can be coupled to at least a portion of the airflow channel.

The airflow generating element can comprise at least a low noise motor. The airflow generating element can comprise a fan driven by the motor, when actuated, a rotation of the fan effects the airflow through the airflow channel. The fan can comprises a plurality of blades. A rotating speed of the motor can be determined based on the number of the blades, such that a blade-passing frequency, which is correlated to a product of a rotating speed of the motor and the number of blades, is substantially within a frequency range of ultrasonic. A noise of the motor can thus be suppressed since humans are not sensitive to a sound having frequency in the range of ultrasonic. The motor can be a high-speed motor. In some instances, the rotating speed of the motor can exceed at least 10,000, 20,000, 30,000, 40,000, 50,000, 60,000, 70,000, 80,000, 90,000, 100,000 or even more revolutions per minute (rpm). The number of the blades can be a prime number other than 2. In an example, the number of the blades can be equal or exceed 3, 5, 7, 9, 11 or 13 or 17.

The high-speed motor can be combined with any other aspect(s) of the disclosure in an apparatus for drying an object. For instance, in an apparatus for drying an object having a high-speed motor, at least one of the one or more radiation energy sources can comprise a first portion that is positioned not contacting the airflow channel. This configuration can be effected since a large volume of airflow is generated within the airflow channel by the high-speed motor, which large volume of airflow lowers an increase in the temperature of the airflow channel and the airflow even if heat is transferred from the radiation energy source. For example, the volume of airflow generated by the motor can be at least 5, 10, 15, 20, 25 or 30 cubic feet per minute (CFM) as measure at the output opening of the apparatus. A heat dissipation efficiency of the radiation energy source can be determined from the volume of airflow generated at the motor and the temperature required for black body radiation of the radiation emitter, and an area of the radiation energy source that is required for heat dissipation can be determined based on the heat dissipation efficiency. The area required for heat dissipation can be a portion of the entire area of the external wall of the radiation energy source to maintain the operating temperature of the radiation energy source within a predetermined temperature range (e.g., the temperature range required for maintaining the radiation emitter at a black body radiation status). Therefore, it can be sufficient to contact a portion of the external surface of the radiation energy source with the airflow channel, to couple a thermal coupling to the radiation energy source, and/or to extend a relatively short protruding member (e.g., a fin) from the radiation energy source into an interior of the airflow channel, to maintain the operating temperature of the radiation energy source within a predetermined temperature range. Due to the large volume of airflow generated by the high-speed motor, heat transferred from the radiation energy source to the airflow channel or the airflow can be efficiently removed without substantially increasing the temperature of the airflow channel or the airflow. In some instances, an increase in the temperature of the airflow in the airflow channel due to the heat transferred from the radiation energy source can be less than 1, 2, 3, 4, or 5 degrees.

The motor can be coupled in the housing by a mounting element, which mounting element can be a part of the airflow generating element. The motor can be received in a chamber of the mounting element. The mounting element can prevent or reduce a vibration and/or noise, which is generated by the motor, from transmitting to the housing. The mounting element can include, for example, a support member of an elastomeric material. In an example, the mounting element can comprise a portion coupled to at least one of the housing, the airflow channel or the radiation energy source.

The disclosure also provides a method for drying an object. The method can comprise providing an airflow channel, via a housing, the airflow channel having an airflow inlet and an airflow outlet; effecting airflow, via an airflow generating element contained in the housing, through the airflow channel, the airflow generating element comprising at least a low noise motor; generating infrared radiation, via a radiation energy source contained in the housing, and directing the infrared radiation toward an exterior of the housing; and providing power, via a power element to at least the radiation energy source and the airflow generating element.

Though the apparatus for drying an object of the disclosure is descried with reference to drawings where a hair dryer is illustrated, those skilled in the art can appreciate that the apparatus for drying an object is not limited to a hair dryer as long as an radiation energy source (e.g., one or more infrared lamps) is utilized as the source of heat energy. In some embodiments, the apparatus for drying an object of the disclosure can be implemented as a clothes dryer or a hand dryer. The clothes dryer can utilize one or more infrared lamps as heat source in association with an airflow generating element to facilitate an evaporation of water from various fabric such as clothes, bed sheets, curtains, and plush toys. The housing of the clothes dryer can comprise a support or a stand. A height of the support or stand can be adjusted.

Figure 14:
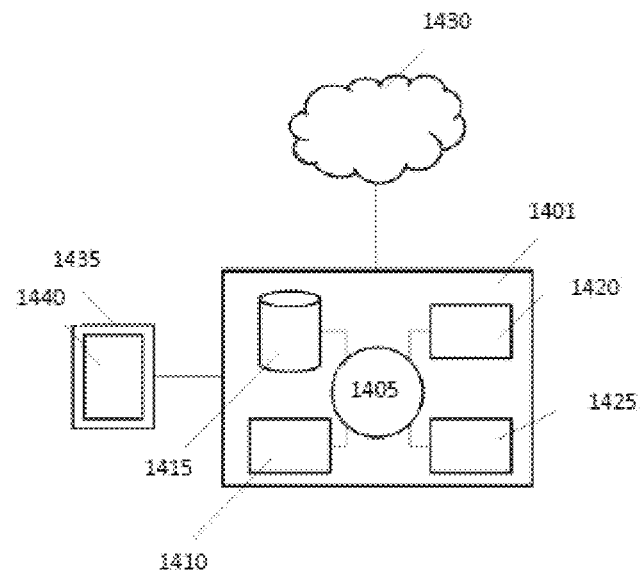
FIG. 14 shows an example of a device control system, in accordance with embodiments of the invention.

FIG. 14 shows an example of a device control system, in accordance with embodiments of the invention. The device control system can be programmed to implement methods and devices of the disclosure.

The device control system includes a central processing unit (CPU, also "processor" and "computer processor" herein) 1405, which can be a single core or multi core processor, or a plurality of processors for parallel processing. The device control system also includes memory or memory location 1410 (e.g., random-access memory, read-only memory, flash memory), electronic storage unit 1415

(e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 can be a data storage unit (or data repository) for storing data. The device control system can be operatively coupled to a computer network ("network") 1430 with the aid of the communication interface 1420. The network 1430 can be the Internet, an internet and/or extranet, or an intranet and/or extranet that is in communication with the Internet.

The network 1430 in some cases is a telecommunication and/or data network. The network 1430 can include one or more computer servers, which can enable distributed computing, such as cloud computing. For example, one or more computer servers may enable cloud computing over the network 1430 ("the cloud") to perform various aspects of analysis, calculation, and generation of the present disclosure, such as, for example, capturing a configuration of one or more experimental environments; performing usage analyses of products (e.g., applications); and providing outputs of statistics of projects. Such cloud computing may be provided by cloud computing platforms such as, for example, Amazon Web Services (AWS), Microsoft Azure, Google Cloud Platform, and IBM cloud. The network 1430, in some cases with the aid of the device control system, can implement a peer-to-peer network, which may enable devices coupled to the device control system to behave as a client or a server.

The CPU 1405 can execute a sequence of machine-readable instructions, which can be embodied in a program or software. The instructions may be stored in a memory location, such as the memory 1410. The instructions can be directed to the CPU 1405, which can subsequently program or otherwise configure the CPU 1405 to implement methods of the present disclosure. Examples of operations performed by the CPU 1405 can include fetch, decode, execute, and writeback.

The CPU 1405 can be part of a circuit, such as an integrated circuit. One or more other components of the system can be included in the circuit. In some cases, the circuit is an application specific integrated circuit (ASIC).

The storage unit 1415 can store files, such as drivers, libraries and saved programs. The storage unit 1415 can store user preference data, e.g., user preferences and user programs. The device control system in some cases can include one or more additional data storage units that are external to the device control system, such as located on a remote server that is in communication with the device control system through an intranet or the Internet.

The device control system can communicate with one or more remote device control systems through the network 1430. For instance, the device control system can communicate with a remote device control system of a user (e.g., a user of an experimental environment). Examples of remote device control systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the device control system via the network 1430.

Methods as described in the disclosure can be implemented by way of machine (e.g., computer processor) executable code stored on an electronic storage location of the device control system, such as, for example, on the memory 1410 or electronic storage unit 1415. The machine executable or machine readable code can be provided in the form of software. During use, the code can be executed by the processor 1405. In some cases, the code can be retrieved from the storage unit 1415 and stored on the memory 1410 for ready access by the processor 1405. In some situations, the electronic storage unit 1415 can be precluded, and machine-executable instructions are stored on memory 1410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the device control system 1401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a device control system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The device control system can include or be in communication with an electronic display 1435 that comprises a user interface (UI) 1440 for providing, for example, the various components (e.g., lab, launch pad, control center, knowledge center, etc) of the model management system. Examples of UI's include, without limitation, a graphical user interface (GUI) and web-based user interface. The electronic display can be a display of a user equipment such as a smartphone.

Methods and devices of the disclosure can be implemented by way of one or more algorithms. An algorithm can be implemented by way of software upon execution by the central processing unit 1405. The algorithm can, for example, generate instructions to operate one or more component of a sample transport system.

Figure 15:
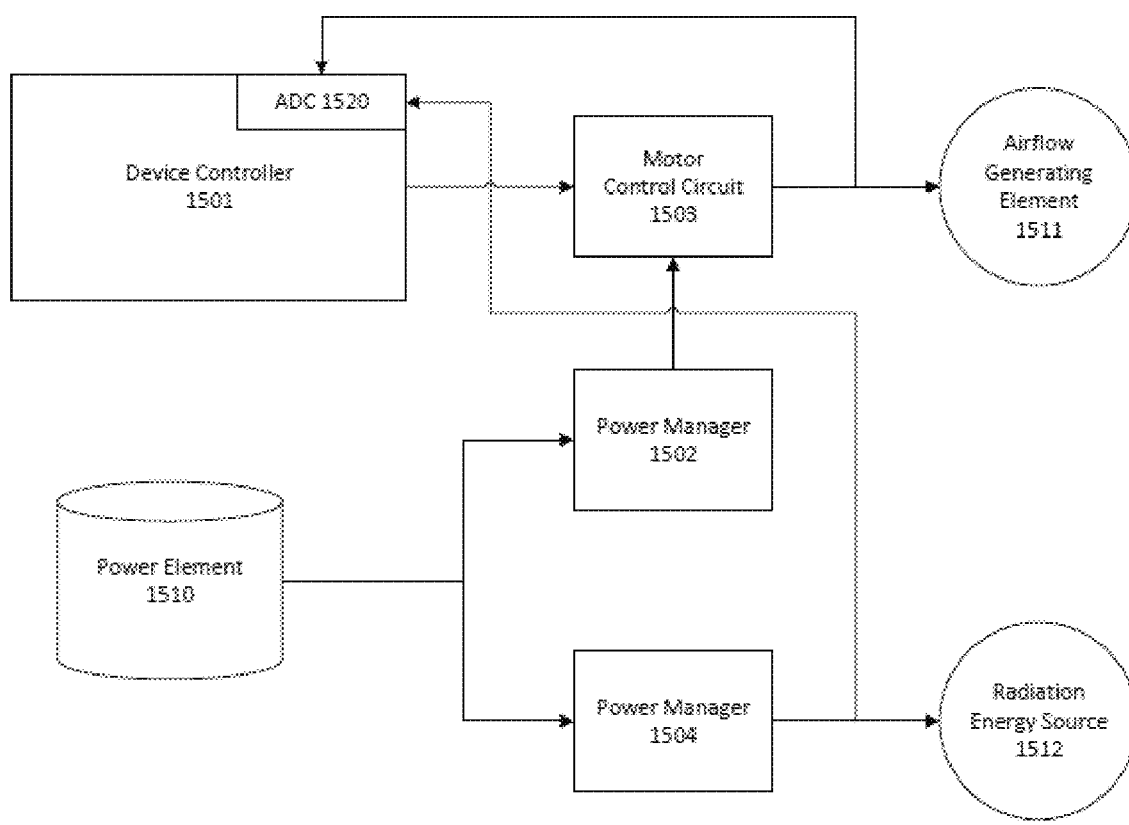
FIG. 15 shows an example of an apparatus for safely drying an object, in accordance with embodiments of the invention.

FIG. 15 shows an example of an apparatus for safely drying an object, in accordance with embodiments of the invention. An exemplary apparatus for drying an object can be a hair dryer as shown in the previous figures.

In accordance with various embodiments, an apparatus for drying an object can comprise a housing, which is configured to provide an airflow channel having an airflow inlet and an airflow outlet. As shown in FIG. 15, the apparatus for drying an object (e.g., a hair dryer) can comprise one or more airflow generating elements, such as an airflow generating element 1511. The airflow generating element 1511 can generate an airflow through the airflow channel in the housing. Also, the apparatus for drying an object can comprise one or more radiation energy sources, such as a radiation energy source 1512. The radiation energy source 1512 can generate radiation and direct the radiation toward an exterior of the housing. In the example of a hair dryer, the radiation generated by the radiation energy source 1512 and the airflow generated by the airflow generating element 1511 can facilitate an evaporation of water from the user's hair more effectively and efficiently.

Additionally, the apparatus for drying an object (e.g., a hair dryer) can comprise a device controller 1501. The device controller 1501, which can be a part of a device control system as described in the previous paragraphs, can control the operation of the one or more airflow generating elements and the one or more radiation energy sources. In various examples, the device controller 1501 in a hair dryer can provide better control over drying speed and comfortableness, the shape and style of hair. For example, the device controller 1501 in a hair dryer can provide a "fast drying mode" that let the radiation energy source 1512 outputs at its maximal power and have the airflow generating element 1511 blow room temperature air at its maximal speed, which helps the hair to dry fast. Also, the device controller 1501 in a hair dryer can provide a "hair protection mode" that allows the radiation energy source 1512 to output radiation energy at a mild level and allows the airflow generating element 1511 to generate a very soft and smooth airflow that help to maintain users' hair with a certain level moisture. In another example, the device controller 1501 in a hair dryer can provide a "normal mode" that turns off the radiation energy source 1512 and blow room-temperature air while the mode is selected, which helps a user to maintain the hairstyle and promote shine in the hair. Also, the device controller 1501 in a hair dryer can provide an "instant heat" capability by adjusting the airflow generating element 1511 and the radiation energy source 1512, so that it takes less time for the hair dryer to heat up and for the hair to dry. In accordance with various embodiments, the device controller 1501 can control the switch of the airflow generating element 1511 and the radiation source 1512.

In accordance with various embodiments, an apparatus for drying an object (e.g., a hair dryer) can comprise a power element 1510 that is configured to provide power to the one or more radiation energy sources and the one or more airflow generating elements. In various examples, the power element 1510 can provide power in either direct current (DC) or alternating current (AC). In the example of a hair dryer, the power element 1510 may provide power in direct current (DC) with a relative low voltage to ensure convenience and safety in operation. Alternatively, the power element 1510 can provide power in alternating current (AC) for AC motor which may be designed specifically for professional-type hair dryers that need to support high performance, operating continuously and in a very powerful way.

The power element can comprise an embedded power source, such as one or more batteries or battery groups. For example, the one or more batteries can be rechargeable (e.g., secondary battery) and/or replaceable. Also, one or more batteries can be received in the housing (e.g., a handle of the housing) of the hair dryer. A status of the battery (e.g., a battery charge status, a remaining power) can be provided by means of, for example, a screen or light-emitting diode (LED) indicator on the housing. Alternatively, the power element can have a wire connection (e.g., via a cord) to an external power source, such that the apparatus for drying an object (e.g., a hair dryer) can be powered with the external power source. The power element can comprise a power adapter which regulates a voltage and/or a current received from the external power source. For instance, a hair dryer can be energized by electrically connecting to an external battery or a power grid via a power cord.

In accordance with various embodiments, the airflow generating element 1511 can comprise an impeller driven by a motor. The impeller can comprise a plurality of blades. When actuated by the motor, a rotation of the impeller can move environment air into the airflow channel via the airflow inlet to generate the airflow, cause the generated airflow to move through the airflow channel and exit from the airflow outlet. The motor can be supported by a motor holder or housed in a motor shroud. The motor can be a brushless motor or a brushed motor. For example, the motor can be a brushless motor of which a speed of rotation can be regulated under the control of the device controller 1501, and a speed of rotation of the motor can be controlled by a preset program, a user's input or a sensor data.

In accordance with various embodiments, an apparatus for drying an object (e.g., a hair dryer) can comprise a power manager 1502 that is configured to manage power supply to the airflow generating element 1511. For example, the power manager can comprise an electric power converter that can convert the input power into a stable voltage suitable for the operation of the motor to the airflow generating element 1511. The electric power converter can be an electronic circuit or electromechanical device such as a DCDC power chip that can convert a direct current (DC) from an input voltage level to a working voltage level for the airflow generating element 1511. For instance, the working voltage for the motor of the airflow generating element 1511 may be 12V or 24V, and the input voltage from an embedded battery group may be 12V~36V and the input voltage from an external power may be 110V or 220V.

As shown in FIG. 15, an apparatus for drying an object (e.g., a hair dryer) can comprise a motor control circuit 1503. The motor control circuit 1503, e.g., a MOS chip, can comprise a field-effect transistor. The motor control circuit 1503 can be configured to regulate a speed of a motor for the airflow generating element 1511. The device controller 1501 can send a drive signal to the motor control circuit 1503. For example, the driving signal can be single-channel or multi-channel, such as 3 channels. The motor control circuit 1503 can be configured to receive a driving signal from the device controller 1501 and generate a drive current to drive the motor for the airflow generating element 1511. Thus, the motor control circuit 1503, which is supplied with power from the power manager 1502, can enable the device controller 1501 to control the switch of the motor and the speed of the motor. In various examples, the device controller 1501 can control the switch of the motor through the enable signal of the power manager 1502 and the enable signal of the motor control circuit 1503. In various examples, the device controller 1501 and the motor control circuit 1503 can be implemented in the same processing unit or located on the same circuit. Alternatively, the device controller 1501 and the motor control circuit 1503 can be implemented in different processing units or located on different circuits that are connected.

In various embodiments, the device controller 1501 can turn off the one or more airflow generating element 1511 through one or more motor drive signal, one or more motor enable signal and/or one or more motor power supply enable signal. The one or more motor enable signal can be a preconfigured sequence of instructions that is capable of being determined via a specific logic gate.

In accordance with various embodiments, an apparatus for drying an object (e.g., a hair dryer) can comprise a power manager 1504 that is configured to manage power supply to the one or more radiation energy sources. For example, the power manager can comprise an electric power converter, which can be an electronic circuit or electromechanical device that can convert a direct current (DC) from an input voltage level to a working voltage level for the radiation energy source 1512.

The radiation energy source 1512 can be configured to generate an infrared radiation and direct the infrared radiation toward an exterior of the housing. In some embodiments, the radiation energy source can be an infrared lamp which converts electric energy into infrared radiation energy. In an exemplary example, the infrared lamp can comprise a radiation emitter configured to emit a radiation having a predetermined wavelength or a predetermined wavelength range) and a reflector configured to reflect the radiation toward the outlet of the airflow channel. In another example, the infrared lamp can also be an infrared Light Emitting Diode (LED) or a laser device such as Carbon Dioxide Laser or halogen lamp. In an exemplary example where a laser device is utilized as the infrared lamp, a reflector may not be necessary. An optical element can be provided to diverge the radiation from the laser device to increase an area that is radiated by the infrared radiation. The radiation energy can be directed to user's hair. Therefore, heat can be transferred to the hair in a radiation heat transfer manner, which increases a heat transfer efficiency of the hair dryer.

In accordance with various embodiments, the device controller 1501 can control the switch of the radiation source through the radiation source enable signal. The device controller 1501 can send the enable signal to the power manager 1504, which can be a DCDC power chip, that supplies power to the radiation energy source 1512, and converts the external voltage into a stable voltage required by the radiation energy source 1512. In an example, the device controller 1501 can turn off the one or more radiation energy sources through one or more radiation source enable signal. The one or more radiation source enable signal can be a preconfigured sequence of instructions that is capable of being determined via a specific logic gate. For example, a motor enable signal can be generated using three '1's from the three of the device controller output pins with an 'AND' gate with three channel input. Any malfunction of the three output pins will stop the 'AND' gate to generate a motor enable signal properly. Also, in order to prevent accidentally turning on the radiation energy source 1512, the radiation source enable signal can be a preconfigured sequence of instructions that can be recognized and verified via a specific logic gate. Similarly, a radiation source enable signal can be generated using three '1's from the three of the device controller output pins with an 'AND' gate with three channel input. Any malfunction of the three output pins will stop the 'AND' gate to generate a radiation source enable signal properly.

In accordance with various embodiments, the power manager 1502 and the power manager 1504 can be separated modules. Thus, the power manager 1502 and the power manager 1504 can provide power in different working voltage levels for the airflow generating element 1511 and the radiation energy source 1512, respectively. Alternatively, the power manager 1502 and the power manager 1504 can share common circuit or modules and can be implemented as an integrated circuit or a single module.

In accordance with various embodiments, the device controller 1501 can monitor and ensure safety during the operation of the one or more airflow generating elements, such as the airflow generating element 1511, and the one or more radiation energy sources, such as the radiation energy source 1512.

As shown in FIG. 15, the device controller 1501 can be configured with an analog to digital converter (ADC) module 1520. The ADC module 1520 can be used to sample a drive current that is provided to a motor of the airflow generating element 1511. The ADC module 1520 can convert an analog signal sampling the drive current into a digital signal for monitoring the motor for the airflow generating element 1511. The ADC module 1520 can sample the drive current periodically during operation. Thus, the ADC module 1520 can detect an abnormal condition associated with the airflow generating element 1511 once an abnormal current value of the drive current is detected. An abnormal current value can be any current value above or below a working current level. Also, an abnormal condition may be detected when a sequence of unexpected current value is detected. For example, the device controller 1501 of a hair dryer can sample the motor current in real time through the ADC module 1520. Through the detection of the change of the motor current, the device controller 1501 can detect that an abnormal condition when the motor is blocked, damaged or the air duct is blocked, if the motor current occurs abnormally, e.g., the motor current is lower than a preset value, the device controller 1501 can turn off the enable control signal of the motor, thereby turning off the motor through the drive signal of the motor or the enable signal of the motor MOS. Also, the device controller 1501 can turn off the motor by sending a zero-speed drive signal to the motor drive or by turning off the enable signal of the motor MOS.

The power manager 1502 can also be turned off at the same time through the enable signal to the power supply for the motor.

In accordance with various embodiments, the ADC module 1520 can also sample an input current that is provided to the radiation energy source 1512. The ADC module 1520 can convert an analog signal sampling the input current into a digital signal for monitoring the motor for the radiation energy source 1512. Thus, the ADC module 1520 can detect an abnormal condition associated with the radiation energy source 1512 once an abnormal current value of the input current is detected. Similarly, an abnormal current value can be any current value above or below a working current level. Also, an abnormal condition may be detected when a sequence of unexpected current value is detected. For example, the device controller 1501 of a hair dryer can sample the current of the radiation source through the ADC module 1520. By comparing with the pre-stored current data, the device controller 1501 can determine whether the radiation source is working at a normal current (or an abnormal current), or whether the radiation source has been turned off. If the device controller 1501 has turned off the radiation source through the enable signal generated directly or indirectly, but the current sampling data shows that there is a current, it means that the power manager 1504 for the radiation source may be abnormal and cannot be turned off. At this time, the device controller 1501 can send a command, e.g., to a battery management chip, to turn off the discharge MOS.

Figure 16:
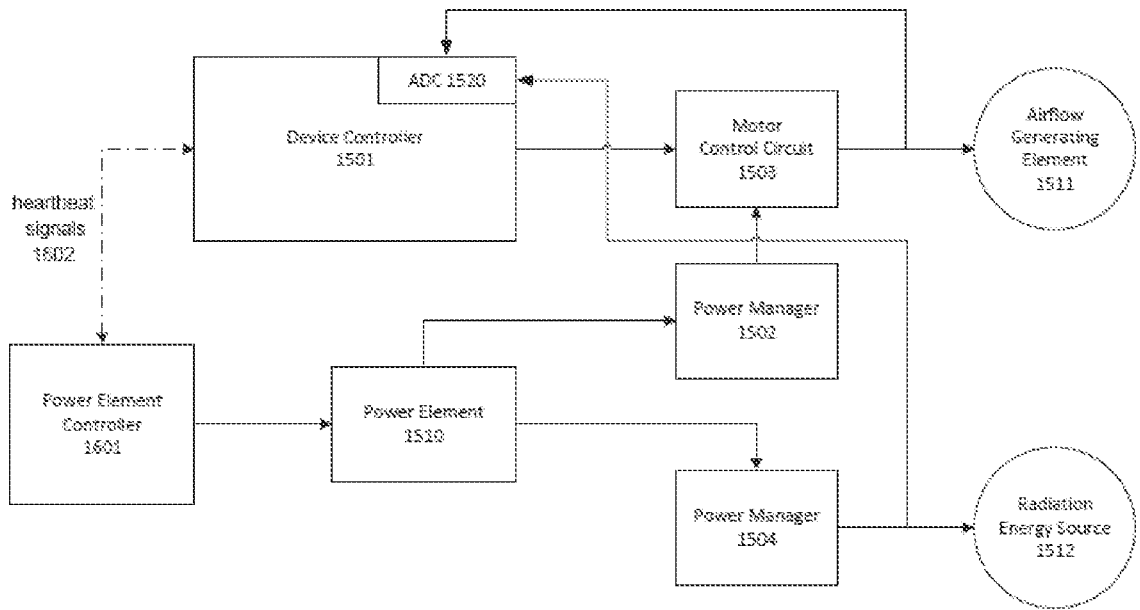
FIG. 16 shows another example of an apparatus for safely drying an object with various safety features, in accordance with embodiments of the invention.

FIG. 16 shows another example of an apparatus for safely drying an object with various safety features, in accordance with embodiments of the invention. An exemplary apparatus for drying an object can be a hair dryer as shown in the previous figures, and such safety features can be implemented in a hair dryer as illustrated in the previous figures.

As shown in FIG. 16, the apparatus for drying an object (e.g., a hair dryer) can comprise a power element 1510 that is configured to provide power to one or more radiation energy sources, such as a radiation energy source 1512, and one or more airflow generating elements, such as an airflow generating element 1511. The power element 1510 can draw energy from either an embedded power source such as batteries or battery groups or an external power source such as an external battery or a power grid. Additionally, an apparatus for drying an object can comprise a device controller 1501 that is configured to control the operation of the one or more airflow generating element and the one or more radiation energy sources.

In accordance with various embodiments, an apparatus for drying an object (e.g., a hair dryer) can comprise a power element controller 1601 that is configured to control the operation of the power element 1510. As shown in FIG. 16, the power element controller 1601 is in connection with the device controller 1501. In various example, the power element controller 1601 and the device controller 1501 can be separate modules on different chips. Alternatively, the power element controller 1601 and the device controller 1501 can be on the same chip or chipset. Additionally, the communication between the power element controller 1601 and the device controller 1501 can be based on various inter-device or intra-device communication protocols or interfaces, such as Inter-Integrated Circuit (I2C) protocol, Serial Peripheral Interface (SPI), universal asynchronous receiver-transmitter WART) protocol, Transmission Control Protocol/Internet Protocol (TCT/IP), Hypertext Transfer Protocol (HTTP), and Message Queuing Telemetry Transport (MQTT).

In accordance with various embodiments, an apparatus for drying an object (e.g., a hair dryer) can adopt a safety scheme to ensure the safety when the apparatus such as a hair dryer is in operation. Using one exemplary safety scheme, the power element controller 1601 and the device controller 1501 can be configured to monitor each other's working status and ensure the safety while the apparatus is in operation. For example, the power element controller 1601 and the device controller 1501 can exchange heartbeat signals 1602 periodically in order to verify that both are in proper conditions or working status. If one of the controllers, either the power element controller 1601 or the device controller 1501, is not functioning properly (e.g., fails to send a heartbeat signal or receive a heartbeat signal 1602), the apparatus can be automatically turned off or shut down.

In one example, the device controller 1501 can turn off the airflow generating element and/or the one or more radiation energy sources, when the device controller 1501 detects that the power element controller 1601 is not working properly or detects an abnormal condition in communication channel. For example, the device controller 1501 can determine that either the power element controller 1601 is not working properly or an abnormal condition exits in the communication channel, when the device controller 1501 does not receive heartbeat signal 1602 from the power element controller 1601. The safety in operating the apparatus may be severely undermined when the power element controller 1601 suffers a malfunction. For example, a user may not be able to turn off the device by pressing a power-off button that is associated with the power element controller. In such a case, the object to be dried using the apparatus may be damaged, and it may even cause human body injury and fire hazards. In order to ensure the safety in operating the apparatus for drying an object (e.g., a hair dryer), the device controller 1501 can turn off the airflow generating element 1511 and/or the radiation energy sources 1512. For example, the device controller 1501 can turn off the airflow generating element 1511 via a motor drive signal, a motor enable signal and/or a motor power supply enable signal. Also, the device controller 1501 can turn off the radiation energy sources 1512 via radiation source enable signal, e.g., when the battery output cannot be turned off normally.

In another example, the power element controller 1601 can turn off the airflow generating element and/or the one or more radiation energy sources, when the power element controller detects that the device controller 1501 is not working properly or detects an abnormal condition in communication channel. For example, the power element controller 1601 can determine that the device controller 1501 is not working properly or an abnormal condition exits in the communication channel, when the power element controller 1601 does not receive heartbeat signal 1602 from the device controller 1501. This indicates that there may be safety hazards, such as that the device controller 1501 has no way to normally turn off the radiation source or motor through the enable signal. Subsequently, the power element controller 1601 can turn off the airflow generating element 1511 and/or the radiation energy sources 1512 via one or more power enable signal (e.g., one or more of battery discharging enable signal and/or battery enable signal).

In various embodiments, the safe operation of the system can be ensured as long as one of the device controller 1501 and the power element controller 1601 works normally. For example, if the probability of failure of the device controller 1501 is p1 and the probability of failure of the power element controller 1601 is p2, then the probability of simultaneous failure is p1×p2, which practically can be a very small number. In this way, the safety and reliability of the dryer using heat/thermal radiation and wind as drying means can be greatly improved.

In accordance with various embodiments, the device controller 1501 can control the switch of the airflow generating element 1511 and the radiation source 1512. For example, in order to prevent accidentally turning on the motor of the airflow generating element 1511, the motor enable signal and the motor power supply enable signal can be a preconfigured sequence of instructions that can be recognized and verified via a specific logic gate. For example, a motor enable signal can be generated using three '1's from the three of the device controller output pins with an 'AND' gate with three channel input. Any malfunction of the three output pins will stop the 'AND' gate to generate a motor enable signal properly. Also, in order to prevent accidentally turning on the radiation energy source 1512, the radiation source enable signal can be a preconfigured sequence of instructions that can be recognized and verified via a specific logic gate. Similarly, a radiation source enable signal can be generated using three '1's from the three of the device controller output pins with an 'AND' gate with three channel input. Any malfunction of the three output pins will stop the 'AND' gate to generate a radiation source enable signal properly.

In some embodiments, the device controller 1501 may lose the ability to switch the airflow generating element 1511 and the radiation source 1512, e.g., when the pins of the device controller 1501 for receiving and transmitting various enable signals (e.g., the motor enable signal and the motor power supply enable signal, the radiation source enable signal) may be damaged. Also, the enable pin of the battery manager controlling the discharge signal may be damaged, in which case the battery manager to lose the ability to control the switch of the discharge MOS. To ensure safe operation, the enable signal can be indirectly generated through the device controller 1501 or the power element controller 1601. Thus, a specific sequence of instructions can be generated so that a specific logic gate can recognize it as the enable signal.

Figure 17:
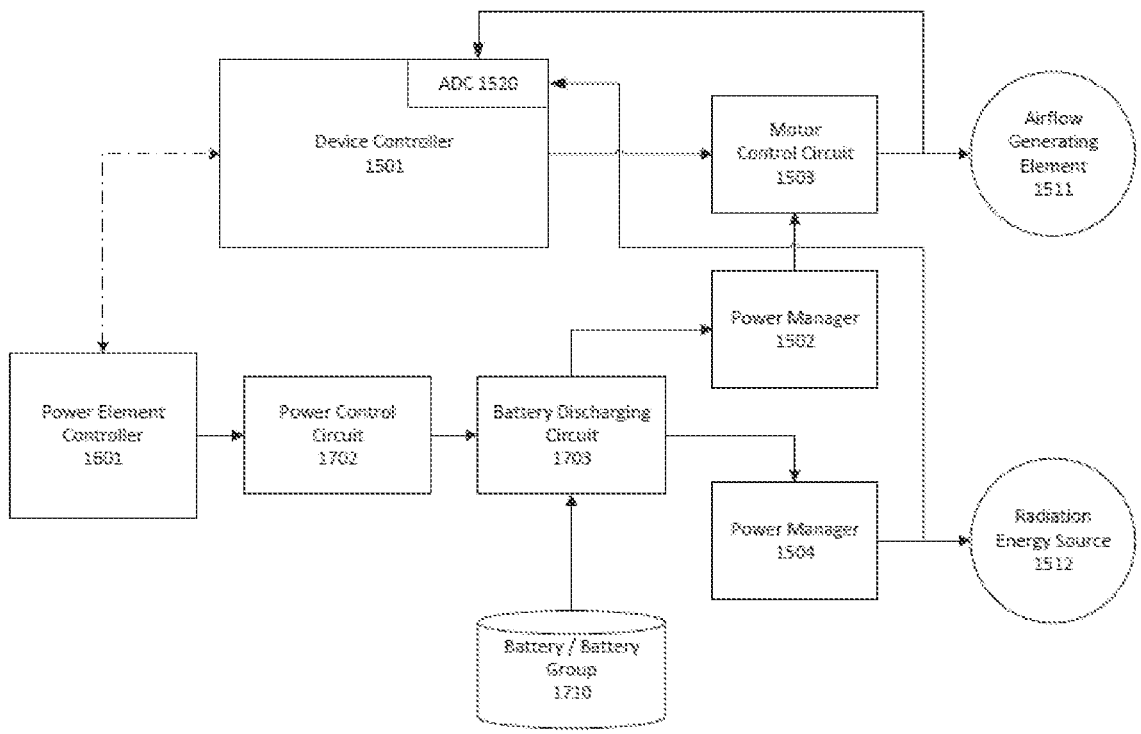
FIG. 17 shows an example of an apparatus for drying an object with various safety features, in accordance with embodiments of the invention.

FIG. 17 shows an example of an apparatus for drying an object with various safety features, in accordance with embodiments of the invention. An exemplary apparatus for drying an object can be a hair dryer as shown in the previous figures, and such safety features can be implemented in a hair dryer as illustrated in the previous figures.

As shown in FIG. 17, an apparatus for diving an object (e.g., a hair dryer) can comprise an airflow generating element 1511 contained in a housing and configured to generate an airflow through an airflow channel. Also, the apparatus for drying an object (e.g., a hair dryer) can comprise one or more radiation energy sources 1512 configured to generate radiation and direct the radiation toward an exterior of the housing.

In the example as shown in FIG. 17, an apparatus for drying an object can take advantage an embedded power source, such as one or more batteries/battery groups 1710. For example, the batteries/battery groups 1710 can be received within the housing. The one or more batteries/battery groups 1710 can be rechargeable (e.g., secondary battery) and/or replaceable. In an exemplary example, one or more batteries can be received in the housing (e.g., a handle of the housing) of the hair dryer. A status of the battery (e.g., a battery charge status, a remaining power) can be provided by means of, for example, a screen or light-emitting diode (LED) indicator on the housing. In one example, a hair dryer can be powered with an embedded power source.

In accordance with various embodiments, a battery management system can be used to support the apparatus for drying an object. The battery management system can comprise various functional blocks including cutoff field-effect transistors (FETs), a fuel gauge monitor, cell voltage monitor, cell voltage balance, real time clock (RTC), temperature monitors and a state machine. There are many types of battery management ICs available. The grouping of the functional blocks can vary widely from a simple analog front end that offers balancing and monitoring and requires a microcontroller (MCU), to a standalone, highly integrated solution that runs autonomously.

In accordance with various embodiments, an apparatus for drying an object (e.g., a hair dryer) can comprise a battery-discharging circuit 1703 that is configured to control discharging of one or more battery cells or cell groups in the one or more batteries/battery groups 1710. In various examples, the battery discharging circuit can comprise one or more field-effect transistors (FETs). For example, two metal-oxide-semiconductor field-effect transistor (MOSFETs) can be used in order to achieve the charge-discharge function. In other examples, more complex system can be used to achieve more sophisticated functions.

As shown in FIG. 17, the battery discharging circuit 1703 can be responsible for distributing electric power to the power manager 1502 and power manager 1504. In various examples, the power manager 1502 can provide power to a motor for an airflow generating element 1511 via a motor control circuit 1503, and the power manager 1504 can provide power to a radiation energy source 1512. The two power chips can convert the battery voltage into the voltage required by the motor and the radiation source respectively and stabilize the output. The device controller 1501 can separately control the output of power by the two power chips through the enable signal.

Additionally, an apparatus for drying an object (e.g., a hair dryer) can comprise a power element controller 1601 that is configured to control operation of a power element to provide power to the radiation energy source 1512 and the airflow generating element 1511. The power element controller 1601 can be associated with a power control circuit 1702. The power element controller 1601 can enable the discharge circuit of the battery through the enable signal sent to the battery power management chip, such as the power control circuit 1702, and delivers the battery's electricity to the input terminals of the two power chips, such as the power manager 1502 and the power manager 1504.

In accordance with various embodiments, an apparatus for drying an object (e.g., a hair dryer) can adopt a safety scheme to ensure the safety when the apparatus is in operation. Using such a safety scheme, the power element controller 1601 and the device controller 1501 can be configured to monitor each other's working status and ensure the safety while the apparatus is in operation. For example, the power element controller 1601 and the device controller 1501 can exchange heartbeat signals 1602 periodically in order to verify that both are in proper conditions or working status. If one of the controllers, either the power element controller 1601 or the device controller 1501, is not functioning properly (e.g., fails to send a heartbeat signal 1602 or receive a heartbeat signal 1602), the apparatus can be automatically turned off or shut down.

As shown in FIG. 17, the device controller 1501 can turn off the airflow generating element and/or the one or more radiation energy sources, when the device controller detects that the power element controller 1601 is not working properly. For example, the device controller 1501 can determine that the power element controller 1601 is not working properly when the device controller 1501 does not receive heartbeat signal 1602 from the that the power element controller or detects an abnormal condition in communication. The safety in operating the apparatus may be severely undermined when the power element controller 1601 suffers a malfunction. For example, a user may not be able to turn off the device by pressing a power-off button that is associated with the power element controller. In such a case, the object to be dried using the apparatus may be damaged, and it may even cause human body injury and fire hazards. In order to ensure the safety in operating the apparatus for drying an object (e.g., a hair dryer), the device controller 1501 can turn off the airflow generating element 1511 and/or the radiation energy sources 1512.

Furthermore, the power element controller 1601 can turn off the airflow generating element and/or the one or more radiation energy sources, when the power element controller 1601 detects that the device controller 1501 is not working properly or detects an abnormal condition in communication. For example, the power element controller 1601 can determine that the device controller 1501 is not working properly when the power element controller 1601 does not receive heartbeat signal 1602 from the that the device controller 1501. This indicates that the device controller 1501 may not be able to normally turn off the radiation source or motor through the enable signals, which can lead to safety hazards.

As shown in FIG. 17, the power element controller 1601 can turn off power supply to the airflow generating element and the one or more radiation energy sources through one or more of battery discharging enable signal and battery enable signal.

Figure 18:
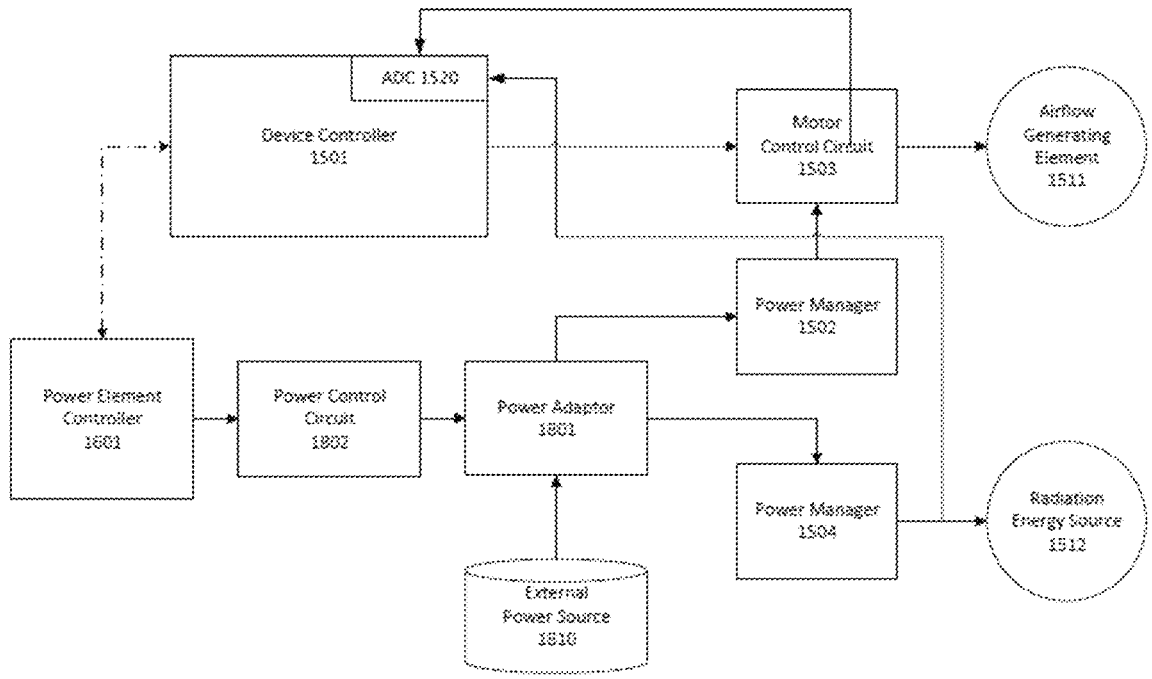
FIG. 18 shows another example of an apparatus for drying an object with various safety features, in accordance with embodiments of the invention.

FIG. 18 shows another example of an apparatus for drying an object with various safety features, in accordance with embodiments of the invention. An exemplary apparatus for drying an object can be a hair dryer as shown in the previous figures, and such safety features can be employed in and/or applied to the hair dryer as shown in the previous figures.

Similar as shown in FIG. 16, an apparatus for drying an object (e.g., a hair dryer) can comprise an airflow generating element 1511 contained in a housing and configured to generate an airflow through an airflow channel. Also, the apparatus for drying an object (e.g., a hair dryer) can comprise one or more radiation energy sources 1512 configured to generate radiation and direct the radiation toward an exterior of the housing.

In the example as shown in FIG. 18, the apparatus for drying an object can comprise a power adaptor 1801, that can distribute the power from an external power source 1810 to the power manager 1502 and power manager 1504. In various examples, the power manager 1502 can provide power to a motor for an airflow generating element 1511 via a motor control circuit 1503, and the power manager 1504 can provide power to a radiation energy source 1512.

Additionally, an apparatus for drying an object (e.g., a hair dryer) can comprise a power element controller 1601 that is configured to control operation of a power element to provide power to the radiation energy source 1512 and the airflow generating element 1511. Furthermore, the power element controller 1601 can be associated with a power control circuit 1802. The power element controller 1601 can enables the power management chip, such as the power control circuit 1802, and delivers the electricity from the external power source 1810 to the input terminals of the two power chips.

In accordance with various embodiments, an apparatus for drying an object (e.g., a hair dryer) can adopt a safety scheme to ensure the safety when the apparatus is in operation. Using such a safety scheme, the power element controller 1601 and the device controller 1501 can be configured to monitor each other's working status and ensure the safety while the apparatus is in operation. For example, the power element controller 1601 and the device controller 1501 can exchange heartbeat signals 1602 periodically in order to verify that both are in proper conditions or working status. If one of the controllers, either the power element controller 1601 or the device controller 1501, is not functioning properly (e.g., fails to send a heartbeat signal 1602 or receive a heartbeat signal 1602), the apparatus can be automatically turned off or shut down.

Similar as shown in FIG. 16, the device controller 1501 can turn off the airflow generating element and/or the one or more radiation energy sources, when the device controller detects that the power element controller 1601 is not working properly. The safety in operating the apparatus may be severely undermined when the power element controller 1601 suffers a malfunction. For example, the device controller 1501 can determine that the power element controller 1601 is not working properly when the device controller 1501 does not receive heartbeat signal 1602 from the that the power element controller or detects an abnormal condition in communication. Subsequently, the device controller 1501 can turn off the airflow generating element 1511 and/or the radiation energy sources 1512.

Furthermore, the power element controller 1601 can turn off the airflow generating element and/or the one or more radiation energy sources, when the power element controller 1601 detects that the device controller 1501 is not working properly or detects an abnormal condition in communication. For example, the power element controller 1601 can determine that the device controller 1501 is not working properly when the power element controller 1601 does not receive heartbeat signal 1602 from the that the device controller 1501.

As shown in FIG. 18, the power element controller 1601 can turn off the airflow generating element and/or the one or more radiation energy sources, when the power element controller 1601 detects that the device controller 1501 is not working properly or detects an abnormal condition in communication. For example, the power element controller 1601 determines that the device controller 1501 is not working properly when the power element controller 1601 does not receive heartbeat signal 1602 from the that the device controller 1501.

As shown in FIG. 18, the power element controller 1601 can turn off power supply to the airflow generating element and/or the one or more radiation energy sources by switching off the power control circuit 1802 or disabling the power adaptor 1801 to cut off the external power source 1810.

Figure 19:
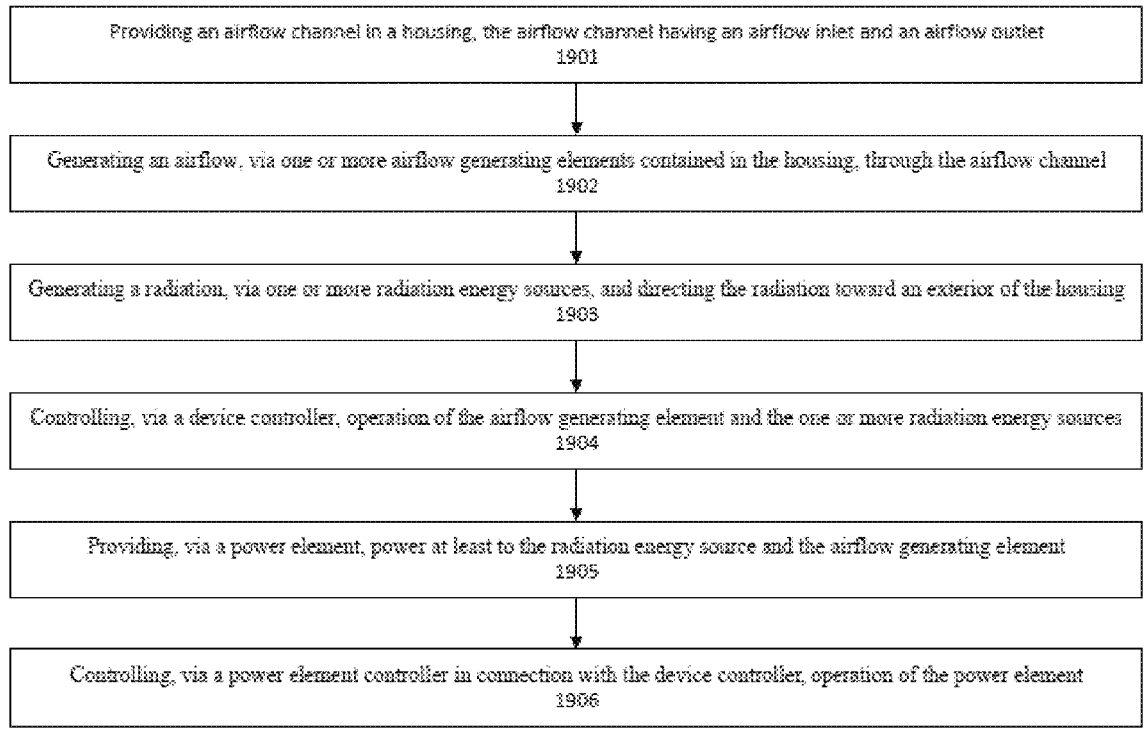
FIG. 19 shows an example of a method for safely drying an object with various safety features, in accordance with embodiments of the invention.

FIG. 19 shows an example of a method for safely drying an object with various safety features, in accordance with embodiments of the invention. An exemplary method for drying an object can be a hair dryer as shown in the previous figures, and various safety features can be employed in and/or applied to the hair dryer as shown in the previous figures.

As shown in FIG. 19, at step 1901, an airflow channel is provided in a housing, the airflow channel having an airflow inlet and an airflow outlet. At step 1902, one or more airflow generating elements contained in the housing can generate an airflow through the airflow channel. At step 1903, one or more radiation energy sources can generate and direct radiation toward an exterior of the housing. At step 1904, a device controller can control the operation of the airflow generating element and the one or more radiation energy sources. At step 1905, a power element can provide power at least to the radiation energy source and the airflow generating element. At step 1906, a power element controller in connection with the device controller can control the operation of the power element.

Figure 20:
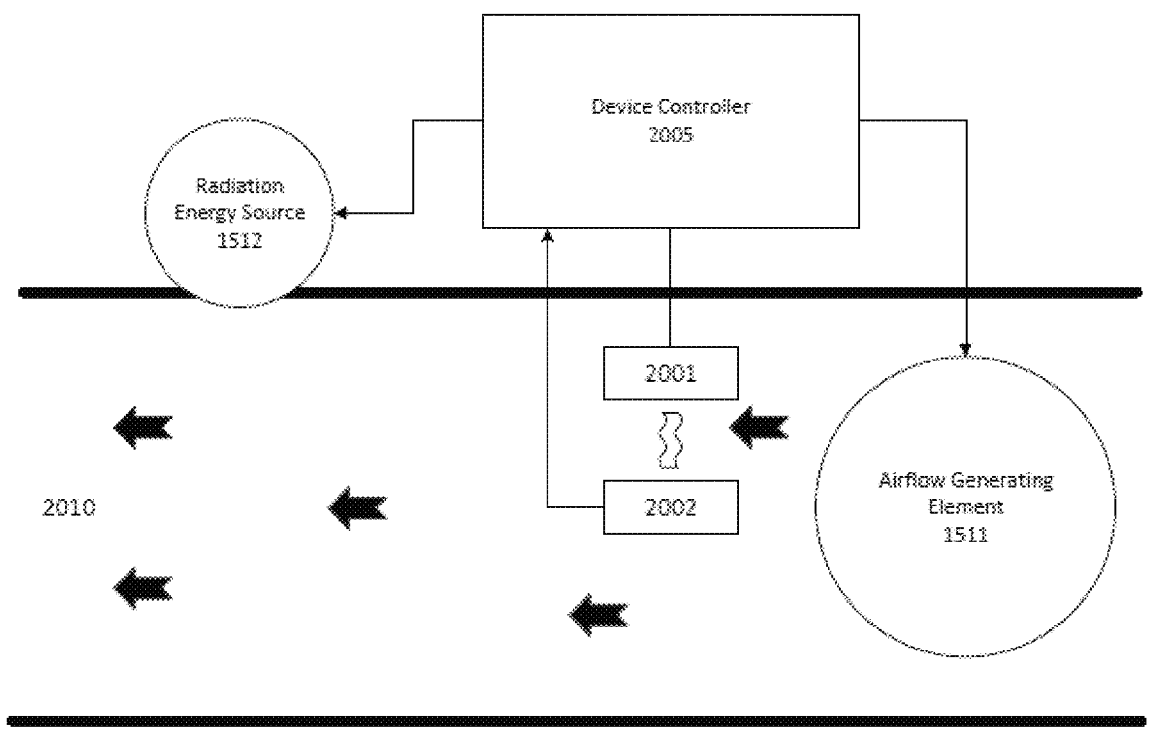
FIG. 20 shows an example of a wind speed detecting device that can be used in an apparatus for drying an object, in accordance with embodiments of the invention.

FIG. 20 shows an example of a wind speed detecting device that can be used in an apparatus for drying an object, in accordance with embodiments of the invention. The wind speed detecting device as shown in FIG. 20 can be integrated into or applied to an exemplary apparatus for drying an object, such as a hair dryer as shown in the previous figures.

In accordance with various embodiments, one or more airflow generating elements, such as an airflow generating element 1511, can generate an airflow through an airflow channel 2010. The airflow generated by the one or more airflow generating elements, such as the airflow generating element 1511, can be directed and/or regulated through an airflow channel 2010 toward a target object such as a user's hair. For instance, the airflow channel 2010 can be shaped to regulate at least a velocity, a throughput, an angle of divergence or a vorticity of the airflow exiting the hair dryer. The airflow channel 2010 can include at least an airflow inlet and an airflow outlet. The airflow inlet and the airflow outlet can each be vent that allows efficient airflow throughput. The environment air can be moved into the airflow channel 2010 via the airflow inlet to generate the airflow, and the generated airflow can exit the airflow channel 2010 via the airflow outlet.

In various embodiments, the airflow channel 2010 may be configured in different geometry shapes. In an example, the airflow inlet and the airflow outlet can be positioned at opposite ends of the hair dryer along a longitudinal direction thereof. In other examples, the airflow channel 2010 can be configured in an arc shape, a spiral shape, or any 3D geometry shape that allows efficient movement of the airflow generated by the one or more airflow generating elements.

In accordance with various embodiments, the airflow generating element 1511 can be positioned at an inlet of the airflow channel 2010. Alternatively, the airflow generating element 1511 can be positioned close to an outlet of the airflow channel 2010. In various embodiments, there can be multiple airflow generating elements that are positioned at different sections of the airflow channel 2010 in order to move the airflow efficiently through the airflow channel 2010. Also, the airflow channel 2010 can have multiple pathways, each of which can be equipped with an airflow generating element, in order to achieve a desired airflow, e.g., for drying a user's hair. For example, the airflow can exit from all pathways at the same time. Alternatively, the airflow may exit from only a portion of the pathways to achieve a particular airflow.

In accordance with various embodiments, a wind speed detecting device can be placed in the airflow channel 2010 to detect the speed of airflow in the airflow channel 2010. Thus, the apparatus for drying an object can determine whether the airflow generating element 1511 has an abnormal condition such as a malfunction.

Additionally, there can be more than one wind speed detecting devices in the airflow channel 2010. For example, the wind speed detecting devices can be placed at different sections of the airflow channel 2010 to detect the speed of airflow at the different sections of the airflow channel 2010. In accordance with various embodiments, different types of wind speed detecting devices with different form factors and capacities can be used. For example, a wind speed detecting device with small form factor can be used at a narrow pathway of the airflow channel 2010. Also, a wind speed detecting device with wide detecting range can be placed at a location where the speed of the airflow may change drastically.

As shown in FIG. 20, a device controller 2005 can receive signals from the wind speed detecting device in order to determine the speed of air flow in the airflow channel 2010, so that the device controller 2005 can determine whether an abnormal condition such as a malfunction occurs. Alternatively, the detected speed of the airflow in the airflow channel 2010 can be provided to a device controller 2005, which in turn can determine whether an abnormal condition such as a malfunction occurs. For example, a wind speed detecting device can be placed at the downstream or upstream of the airflow generating element 1511 so that the wind speed detecting device can detect when the airflow generating element 1511 encounters a malfunction such as a motor malfunction or blockage.

In accordance with various embodiments, different types of wind speed detecting devices can be used for detecting the speed of air flow in the airflow channel 2010. For example, various types of anemometers such as cup anemometers, hot wire or thermal flow anemometers, pressure tube anemometer, ultrasonic anemometers, and laser Doppler anemometers can be used.

An exemplary wind speed detecting device can comprise a heating resistor 2001, a temperature sensitive resistor 2002, which is exposed in an airflow in the airflow channel 2010. In accordance with various embodiments, a temperature sensitive resistor may have a high enough temperature coefficient of resistance, indicating variation of electrical resistivity with temperature. The temperature sensitive resistor can be used for measuring the speed of air flow. For example, a temperature sensitive resistor can be in the form of either a hot wire or a hot film. When the temperature sensitive resistor is cooled by the surrounding air in the airflow, the electrical resistance of the temperature sensitive resistor would decrease which reflects the speed of the air flow.

In various embodiments, the temperature sensitive resistor 2002 can be thermally coupled to the heating resistor 2001. The heating resistor 2001 and the temperature sensitive resistor 2002 can be coupled together using thermal conductive and electrical insulating) material. Additionally, the heating resistor can be placed within a proximity of the temperature sensitive resistor 2002. For example, both the heating resistor 2001 and the temperature sensitive resistor 2002 can be placed on a printed circuit board (PCB).

In various embodiments, both the heating resistor 2001 and the temperature sensitive resistor 2002 can be placed within an apparatus for drying an object (e.g., a hair dryer), such as the airflow channel 2010. Also, the heat energy generated by the heating resistor 2001 may be limited. Thus, unlike a conventional hair dryer, the heating resistor is not used for the purpose of heating up the airflow so that a warm air flow can be generated for drying a user's hair. Here, the heating resistor 2001 is used for the purpose of conveniently detecting the speed of airflow in the airflow channel 2010. Thus, a temperature at the air flow inlet and a temperature at the air flow outlet can be substantially the same (e.g., different by a few degrees). Those skilled in the art can appreciate that, a temperature of the airflow may be inevitably increased to some extent by electric components in the hair dryer such as circuits, electrical wires, power leads, power adaptor and controller. For instance, an increase in temperature of the airflow traveling through the entire airflow channel can be no more than 20° C., 19° C., 18° C., 17° C., 16° C., 15° C., 14.5° C., 14.0° C. 13.5° C., 13.0° C., 12.5° C., 12.0° C., 11.5° C., 11.0° C., 10.5° C., 10.0° C., 9.5° C., 9.0° C., 8.5° C., 8.0° C., 7.5° C., 7.0° C., 6.5° C., 6.0° C., 5.5° C., 5.0° C. or less. In an exemplary example, the room temperature is 25° C., and an increase in temperature of the airflow travelling through the entire airflow channel of the hair dryer of the disclosure is at most 15° C., resulting in a temperature of airflow at the airflow outlet at most 40° C., which is much lower than the temperature of the airflow blowing out of a conventional hot air-based hair dryer. In a comparative example, the temperature of the airflow blowing out of a conventional hair dryer No. 1 (Dyson@ FOOD is about 140° C. In another comparative example, the temperature of the airflow blowing out of a conventional hair dryer No. 2 (Panasonic@ EH-JNA9C) is about 105° C.

In accordance with various embodiments, other components such as one or more radiation energy sources can be placed close to the airflow channel 2010. In the example as shown in FIG. 20, portions of an outer surface of a radiation energy source 1512, such as a portion of the enclosing structure of the radiation energy source 1512, can be exposed to the airflow in the airflow channel 2010. Thus, the airflow can remove abundant heat generated by the radiation energy source 1512 to maintain a proper working condition of the radiation energy source 1512. In one example, the temperature sensitive resistor 2002 of wind speed detecting device can be placed at a place distal to the radiation energy source 1512, so that the heat generated by the radiation energy source 1512 does not affect the condition of the temperature sensitive resistor 2002.

In the example of a hair dryer, it is preferably that a wind speed detecting device can have a small form factor so that the wind speed detecting device does not disturb the airflow in the airflow channel 2010. Also, it can improve the precision in measuring the speed of air flow in the airflow channel 2010.

Figure 21:
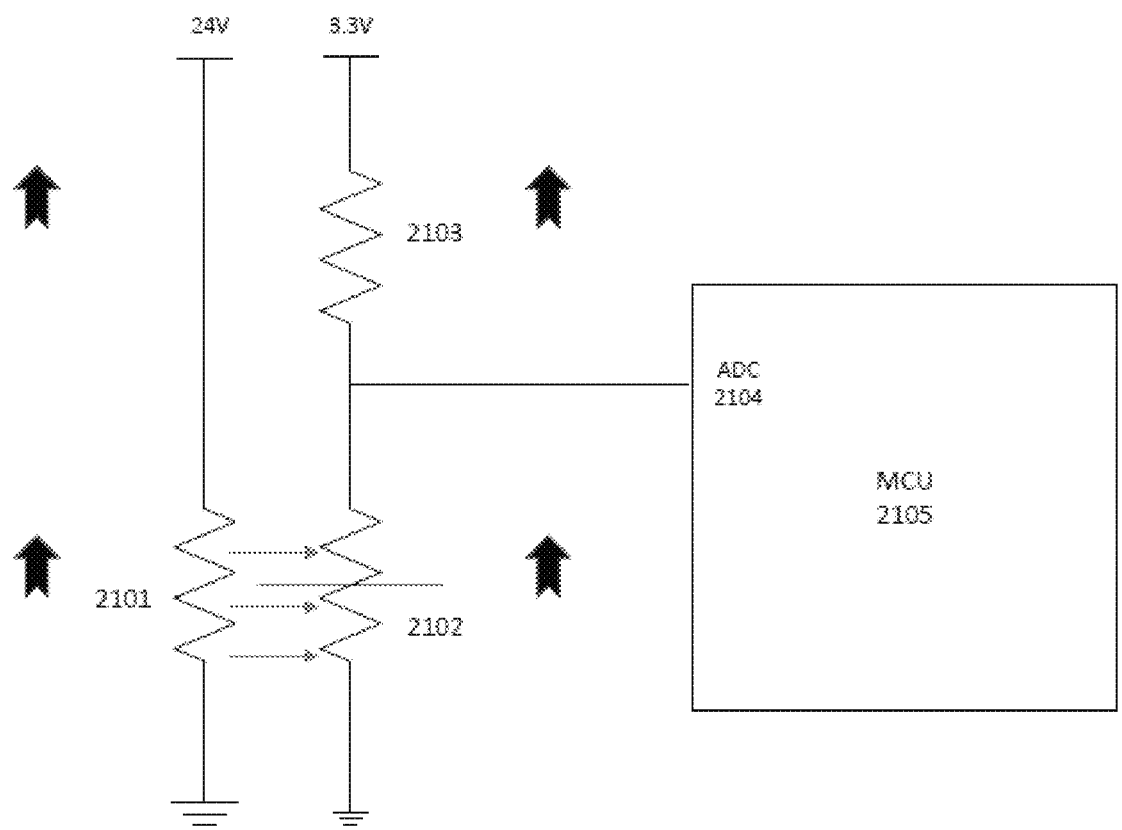
FIG. 21 shows an exemplary design of a wind speed detecting device that can be used in an apparatus for drying an object with various safety features, in accordance with embodiments of the invention.

FIG. 21 shows an exemplary design of a wind speed detecting device that can be used in an apparatus for drying an object with various safety features, in accordance with embodiments of the invention. As shown in FIG. 21, in order to detect the wind speed in an airflow, a temperature sensitive resistor 2102 can be thermally coupled to a heating resistor 2101.

As shown in FIG. 21, the temperature sensitive resistor 2102 can be placed within a close vicinity of the heating resistor 2101 so that the heating resistor 2101 can heat up the temperature sensitive resistor 2102 once a power is connected to the heating resistor 2101. For example, the radiation generated by the resistor 2101 can directly heat up the temperature sensitive resistor 2102. Also, the heating resistor 2101 can heat up the airflow in the vicinity, which in turn can conduct the heat to the temperature sensitive resistor 2102, e.g., via air convection. Alternatively, the heating resistor 2101 can be coupled with the temperature sensitive resistor 2102 via thermally conductive but electrically insulating material, so that the heat generated by the heating resistor 2101 can be conducted to the temperature sensitive resistor 2102.

On the other hand, the surrounding air flow can dissipate the heat away from the vicinity of the temperature sensitive resistor 2102. The stronger the airflow is, the more heat can be dissipated away from the temperature sensitive resistor 2102. As a result, it can reduce the temperature at the temperature sensitive resistor 2102 and change the resistance value of the temperature sensitive resistor 2102. In various embodiments, the temperature at the temperature sensitive resistor 2102 can be determined by measuring a resistance value of the temperature sensitive resistor 2102. Thus, the speed of the air flow can be determined (e.g., empirically) based on the temperature of the incoming air flow (e.g., the environment temperature) before it is heated up by the heating resistor 2101 and the value of the resistance measured at the temperature sensitive resistor 2102.

In accordance with various embodiments, a table can be constructed to maintain a corresponding relationship between the temperature at the temperature sensitive resistor 2102 and the speed of the air flow. For example, a table can be constructed for different environment temperatures. Thus, the speed of the air flow can be determined by measuring a resistance value of the temperature sensitive resistor 2102.

When the speed of the airflow changes, the apparatus can detect the abnormality of the motor by detecting the temperature of the temperature-sensitive resistor, and discover potential safety risks, and turn off the radiation source and the motor. For example, the apparatus can collect information on the voltage of the temperature-sensitive resistor 2102 through the ADC module 2104. Then, the speed of the air flow can be determined by looking up the temperature of the temperature-sensitive resistor 2102 in the table.

In various embodiments, the wind speed detecting device can include a circuit that comprises a temperature sensitive resistor 2102 and a temperature insensitive resistor 2103, both of which can be positioned within a close distance from the heating resistor 2101, and both of which may be exposed in the airflow, so that the temperature at both the temperature sensitive resistor 2102 and the temperature insensitive resistor 2103 can be substantially the same.

In the example as shown in FIG. 21, the temperature insensitive resistor 2103 can be placed at downstream of the temperature sensitive resistor 2102. Alternatively, the temperature insensitive resistor 2103 can be placed at an opposite side of the heating resistor 2101, so that the distance between the temperature insensitive resistor 2103 and the heating resistor 2101 can be substantially the same as the distance between the heating resistor 2101 and the temperature sensitive resistor 2102.

In accordance with various embodiments, the resistance value of a temperature insensitive resistor 2103 does not change drastically as the temperature changes. A temperature insensitive resistor may have a low enough temperature coefficient of resistance, indicating that electrical resistivity does not change with temperature. The temperature insensitive resistor can be used as a reference for the measurement of the speed of air flow.

As shown in FIG. 21, the temperature insensitive resistor 2103 is in series connection with the temperature sensitive resistor 2102. Thus, the resistance value of the temperature sensitive resistor 2102 can be determined based on the known resistance value of the temperature insensitive resistor 2103 and a relative voltage drop.

Also as shown in FIG. 21, a device controller, such as a MCU 2105, can be configured to detect the speed of the airflow in the airflow channel by measuring a resistance value of the temperature sensitive resistor 2102. The MCU 2105 can comprise an ADC module 2104 that can be used for measuring a voltage value ($U_{Measured}$) at a point between the temperature sensitive resistor 2102 and the temperature insensitive resistor 2103. Thus, the MCU 2105 can calculate the voltage drop at the temperature sensitive resistor and the voltage drop at the temperature insensitive resistor. Then, the MCU 2105 can determine the resistance value of the temperature sensitive resistor at any given time by evaluating the voltage drop at the temperature sensitive resistor relative to the voltage drop at the temperature insensitive resistor and a known resistance value of the temperature insensitive resistor 2103, e.g., using the following formula.

$$R_{Sensitive} = \frac{U_{Measured}}{U_{Total} - U_{Measured}} R_{Insensitive}$$

In an alternative design, the temperature insensitive resistor 2003 and the temperature sensitive resistor 2002 can be configured in parallel connection. Thus, the resistance value of the temperature sensitive resistor 2102 can be determined based on the known resistance value of the temperature insensitive resistor 2103 and current ratio. In such an alternative design, the device controller can compromise an ADC module that can measure a current value at the temperature sensitive resistor and a current value at the temperature insensitive resistor. Thus, the controller can determine the resistance value of the temperature sensitive resistor by evaluating the current value at the temperature sensitive resistor relative to the current value at the temperature insensitive resistor.

Referring to FIG. 20, the device controller 2005 can determine the speed of the airflow in the airflow channel 2010. For example, by taking advantage of a wind speed detector as shown in FIG. 21, a device controller 2005 can determine the speed of air flow in the airflow channel by measuring a resistance value of the temperature sensitive resistor 2002. Thus, the device controller 2005 can be aware of the working condition and status of the airflow generating element 1511 and the radiation energy source 1512.

In accordance with various embodiments, the device controller 2005 can turn off or shut down the power to the apparatus (e.g., to shut down the airflow generating element and/or the one or more radiation energy sources), if an abnormal condition is detected. In one example, the device controller 2005 can detect an abnormal wind speed in the airflow channel 2010 by determining that the resistance value of the temperature sensitive resistor 2002 is abnormal. For example, the device controller 2005 can determine that the resistance value of the temperature sensitive resistor 2002 is abnormal by comparing the resistance value with a preconfigured table. In another example, the device controller 2005 can obtain a temperature associated with a temperature sensitive resistor 2002 by evaluating the resistance value of the temperature sensitive resistor. The device controller 2005 can detect an abnormal wind speed in the airflow channel by determining that the temperature associated with the temperature sensitive resistor is abnormal. For example, the device controller 2005 can determine that the temperature associated with the temperature sensitive resistor is abnormal by comparing the temperature with a preconfigured table.

Figure 22:
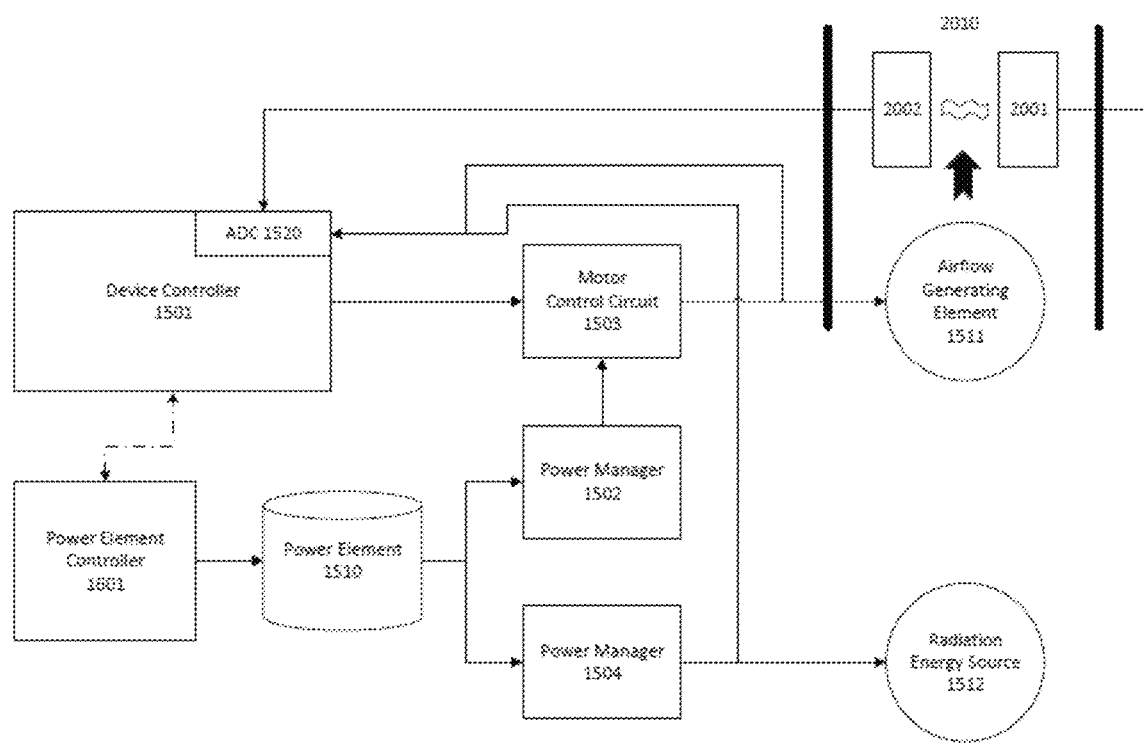
FIG. 22 shows an example of an apparatus for drying an object with a wind speed detecting device along with other safety features, in accordance with embodiments of the invention.

FIG. 22 shows an example of an apparatus for drying an object with a wind speed detecting device along with other safety features, in accordance with embodiments of the invention. An exemplary apparatus for drying an object can be a hair dryer as shown in the previous figures, and various safety features including the wind speed detecting device can be implemented in and/or be applied to the hair dryer as shown in the previous figures.

In accordance with various embodiments, one or more airflow generating elements, such as an airflow generating element 1511, can generate an airflow through an airflow channel 2010. The airflow generated by the one or more airflow generating elements, such as the airflow generating element 1511, can be directed and/or regulated toward a target object such as a user's hair. For instance, the airflow channel 2010 can be shaped to regulate at least a velocity, a throughput, an angle of divergence or a vorticity of the airflow exiting the hair dryer. The airflow channel 2010 can include at least an airflow inlet and an airflow outlet. The airflow inlet and the airflow outlet can each be vent that allows efficient airflow throughput. The environment air can be moved into the airflow channel 2010 via the airflow inlet to generate the airflow, and the generated airflow can exit the airflow channel 2010 via the airflow outlet.

In accordance with various embodiments, the airflow channel 2010 can be configured to surround the one or more radiation energy sources that can generate radiation heat energy and direct the heat energy to an object, e.g., a user's hair. In the examples as shown in FIG. 1 and FIG. 2, a hair dryer can comprise a housing 101. The housing 101 can provide one or more airflow channels therein. An airflow channel enclosure 105 can be provided to define the airflow channel 107 (e.g., as a boundary of the airflow channel). The motor and impeller can be positioned adjacent to an inlet end of the airflow channel enclosure. For instance, a cross-sectional shape of the airflow channel enclosure can vary along a longitudinal direction thereof to generate a desired velocity distribution and/or angle of divergence of the airflow exiting the airflow outlet. In some instances, a radiation energy source, such as an infrared lamp, can be housed within an infrared lamp enclosure 106. The infrared lamp enclosure can serve to protect the infrared lamp. A space between an outer surface of the infrared lamp and an inner surface of the infrared lamp enclosure can be provided with a degree of vacuum. In some embodiments, the one or more radiation energy sources, such as the infrared lamp enclosure 106, can be positioned within the airflow channel enclosure 105. As shown in FIG. 2, at least a portion of the airflow channel 107 can be defined by the airflow channel enclosure 105 and the infrared lamp enclosure 106. A lateral view of a hair dryer having this configuration is shown in FIG. 4, where an output of the infrared lamp 103 can be encompassed by the airflow outlet of the airflow channel 107.

In accordance with various embodiments, the one or more radiation energy sources can be configured to surround at least a portion of the airflow channel 2010. In the example as shown in FIG. 6 and FIG. 7, the airflow outlet of the airflow channel 607 can be positioned between the infrared lamp 603 and the chamber 611. FIG. 9 shows a lateral view of the hair dryer of FIG. 6 and FIG. 7, where the chamber is centrally positioned while the airflow out of the airflow channel 607 is encompassed by the infrared lamp 603. Though not shown, in alternative embodiments, the airflow outlet of the airflow channel 607 can be positioned between the housing 601 and the infrared lamp 603 to form a configuration where the infrared lamp is encompassed by the airflow out of the airflow channel.

In some embodiments, the infrared lamp enclosure can be positioned external to the airflow channel enclosure (for example, the infrared lamp enclosure is not encompassed by the airflow channel enclosure). A lateral view of a hair dryer having this configuration is shown in FIG. 5, where an output of the infrared lamp 103 is separated from the airflow outlet of the airflow channel 107. Those in the art will appreciate that either the airflow channel enclosure or the infrared lamp enclosure can be optional.

As shown in FIG. 22, the apparatus for drying an object (e.g., a hair dryer) can comprise a power element 1510 that is configured to provide power to one or more radiation energy sources, such as the radiation energy source 1512, and one or more airflow generating elements, such as the airflow generating element 1511. The power element 1510 can draw energy from either an embedded power source, such as batteries or battery groups, or an external power source, such as an external battery or a power grid. Additionally, an apparatus for drying an object can comprise a device controller 1501 that is configured to control operation of the one or more airflow generating element and the one or more radiation energy sources.

In accordance with various embodiments, an apparatus for drying an object (e.g., a hair dryer) can adopt a comprehensive safety scheme to ensure the safety when the apparatus such as a hair dryer is in operation. A device controller 2005 for the apparatus can achieve comprehensive situation awareness by taking advantage various types of sensors such as temperature sensor, and humidity sensor. Additionally, one or more wind speed detecting devices can be used in conjunction with the various types of sensors.

In accordance with various embodiments, a wind speed detecting device can be placed in the airflow channel 2010 to detect the speed of airflow in the airflow channel 2010. For example, a wind speed detecting device can be placed at the downstream or upstream of the airflow generating element 1511 so that the wind speed detecting device can detect when the airflow generating element 1511 encounters a malfunction such as an overheat or blockage condition.

As shown in FIG. 22, the device controller 2005 can receive signals from the wind speed detecting device in order to determine the speed of the air flow in the airflow channel 2010, so that the device controller 2005 can determine whether an abnormal condition such as a malfunction of the airflow generating element 1511 occurs. Alternatively, the detected speed of the airflow in the airflow channel 2010 can be provided to a device controller 2005, which in turn can determine whether an abnormal condition such as a malfunction of the airflow generating element 1511 occurs.

In accordance with various embodiments, the power element controller 1601 and the device controller 1501 can be configured to monitor each other's working status and ensure the safety while the apparatus is in operation. For example, the power element controller 1601 and the device controller 1501 can exchange heartbeat signals 1602 periodically in order to verify that both are in proper conditions or working status. If one of the controllers, either the power element controller 1601 or the device controller 1501, is not functioning properly (e.g., fails to send a heartbeat signal 1602 or receive a heartbeat signal 1602), the apparatus can be automatically turned off or shut down.

Using the comprehensive safety scheme as shown in FIG. 22, the device controller 1501 may be able to detect an abnormal condition occurring at the airflow generating element 1511 or the radiation energy source 1512 via multiple different mechanisms. Thus, the apparatus can operate safely even when one or more safety measures fail to function properly.

In one example, the device controller 1501 may be able to detect an abnormal condition when receives from the ADC module an abnormal motor drive current value (e.g., when there is motor overheat or blockage). In another example, the device controller 1501 may be able to detect the abnormal condition, when detects an abnormal windspeed in the airflow channel. Thus, the device controller 1501 may be able to detect the abnormal condition even when there is only one indication that an abnormal condition occurs.

In accordance with various embodiments, it is also possible for the device controller 1501 to avoid false alarm situation. For example, the windspeed in the airflow channel may be affected when different hair dryer attachments (e.g., a concentrator nozzle or a diffuser attachment) are applied on a hair dryer. In such cases, even when the device controller 1501 detects an abnormal windspeed in the airflow channel, the device controller 1501 can verify the situation by checking the motor drive current value received from the ADC module and/or a temperature sensor that measures the temperature of the airflow. It may be reasonable for the device controller 1501 to determine a false alarm situation when the sampled current value and the temperature reading are normal even though a slightly abnormal windspeed is detected. Alternatively, it may also be reasonable for the device controller 1501 to determine an abnormal situation when any one of the sampled current value, the temperature reading is normal and detected windspeed is abnormal.

Additionally, by taking advantage of the various sensing devices such as a wind speed detector and various sensors, the device controller 1501 can collect and analyze the information about the working condition of the apparatus for drying an object (e.g., a hair dryer). Thus, a comprehensive status awareness of the working condition of the apparatus for drying an object (e.g., a hair dryer) can be achieved. In various embodiments, the device controller 1501 can alert the user of any potential risk even before an abnormal condition occurs. For example, the device controller 1501 can alert the user about a partial blockage (e.g., hair) in the airflow channel, so that the user can proceed to resolve such partial blockage (e.g., by removing the hair manually) to ensure safe and efficient operation of the hair dryer.

It should be understood from the foregoing that, while particular implementations have been illustrated and described, various modifications can be made thereto and are contemplated herein. It is also not intended that the invention be limited by the specific examples provided within the specification. While the invention has been described with reference to the disclosure, the descriptions and illustrations of the preferable embodiments herein are not meant to be construed in a limiting sense. Aspects of the preferable embodiments can be combined in other embodiments. For instance, the one or more radiation energy sources having a first portion that is positioned not contacting the airflow channel, the thermal coupling coupled to at least one of the one or more radiation energy sources, the reflector of the one or more radiation energy sources having a cut-away shape, the radiation energy source in which the radiation emitter being positioned and oriented such that a distal end of the radiation emitter does not point to the opening of the reflector, the radiation emitter having one or more radiation reflecting elements, and the high-speed motor, can be arbitrarily combine in other embodiments that are not particularly described in the disclosure. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:
1. An apparatus for drying an object, the apparatus comprising:

a housing configured to provide an airflow channel having an airflow inlet and an airflow outlet;

an airflow generating element contained in the housing and configured to generate an airflow through the airflow channel;

one or more radiation energy sources configured to generate radiation and direct the radiation toward an exterior of the housing;

a device controller configured to control operation of the airflow generating element and the one or more radiation energy sources; and a power element controller configured to monitor each other's working status with the device controller, wherein the power element controller and the device controller are configured to exchange and receive heartbeat signals periodically to verify proper working status.

2. The apparatus of claim 1, wherein the apparatus further comprises a power element that is configured to provide power at least to the radiation energy source and the airflow generating element.

3. The apparatus of claim 2, wherein the power element controller is connected with the device controller, and control operation of the power element.

4. The apparatus of claim 3, wherein the apparatus further comprises a power control circuit.

5. The apparatus of claim 4, wherein the power control circuit comprises a battery discharging circuit that is configured to control discharging of one or more battery cells or cell groups of the power element.

6. The apparatus of claim 5, wherein the battery discharging circuit comprises a field-effect transistor.

7. The apparatus of claim 2, wherein the device controller is configured to detect an abnormal wind speed in the airflow channel via a wind speed detecting device.

8. The apparatus of claim 7, wherein the wind speed detecting device comprises a temperature sensitive resistor that is thermally coupled with a heating resistor.

9. The apparatus of claim 8, wherein the device controller is configured to detect the abnormal wind speed by determining that a temperature associated with the temperature sensitive resistor is abnormal.

10. The apparatus of claim 9, wherein the device controller operates to measure the temperature associated with the temperature sensitive resistor based on measuring a resistance value of the temperature sensitive resistor.

11. The apparatus of claim 9, wherein the device controller operates to detect the abnormal wind speed by comparing the measured temperature associated with the temperature sensitive resistor with a relationship between the temperature at the temperature sensitive resistor and the speed of the air flow.

12. The apparatus of claim 9, wherein the device controller operates to turn off the airflow generating element and/or the one or more radiation energy sources after detecting the abnormal wind speed.

13. The apparatus of claim 8, wherein the wind speed detecting device further comprises a temperature insensitive resistor exposed in the airflow channel.

14. The apparatus of claim 13, wherein the temperature insensitive resistor is in series connection with the temperature sensitive resistor.

15. The apparatus of claim 14, wherein the device controller is associated with an analog to digital converter (ADC) module that operates to measure a voltage drop at the temperature sensitive resistor and a voltage drop at the temperature insensitive resistor.

16. The apparatus of claim 15, wherein the device controller operates to measure a resistance value of the temperature sensitive resistor by comparing a voltage drop at the temperature sensitive resistor relative to a voltage drop at the temperature insensitive resistor.

17. The apparatus of claim 13, wherein the temperature insensitive resistor is in parallel connection with the temperature sensitive resistor.

18. The apparatus of claim 17, wherein the device controller is associated with an ADC module that operates to measure a current value at the temperature sensitive resistor and a current value at the temperature insensitive resistor.

19. The apparatus of claim 18, wherein the device controller operates to determine the resistance value of the temperature sensitive resistor by evaluating the current value at the temperature sensitive resistor relative to the current value at the temperature insensitive resistor.

20. The apparatus of claim 7, wherein a difference between a temperature at the air flow inlet and a temperature at the air flow outlet is below 20° C.

21. The apparatus of claim 1, wherein the device controller is configured to turn off at least one of the airflow generating element or the one or more radiation energy sources, when the device controller detects that the power element controller is not working properly.

22. The apparatus of claim 21, wherein the device controller determines that the power element controller is not working properly when the device controller does not receive heartbeat signal from the that the power element controller or detects an abnormal condition in communication.

23. The apparatus of claim 21, wherein the device controller operates to turn off the airflow generating element through one or more of motor drive signal, motor enable signal and motor power supply enable signal.

24. The apparatus of claim 21, wherein the device controller operates to turn off the one or more radiation energy sources through one or more radiation source enable signal.

25. The apparatus of claim 1, wherein the power element controller is configured to turn off at least one of the airflow generating element or the one or more radiation energy sources, when the power element controller detects that the device controller is not working properly.

26. The apparatus of claim 25, wherein the power element controller determines that the device controller is not working properly when the power element controller does not receive heartbeat signal from the that the device controller or detects an abnormal condition in communication.

27. The apparatus of claim 25, wherein the power element controller operates to turn off power supply to at least one of the airflow generating element or the one or more radiation energy sources through one or more of battery discharging enable signal or battery enable signal.

28. The apparatus of claim 1, wherein a portion of at least one of the one or more radiation energy sources is positioned contacting airflow in the airflow channel.

* * * * *